United States Patent
Hanakawa et al.

(10) Patent No.: US 6,747,723 B2
(45) Date of Patent: Jun. 8, 2004

(54) LIQUID CRYSTAL DEVICE HAVING MULTI-LAYER ELECTRODE, METHOD OF MAKING THE SAME, AND ELECTRONIC APPARATUS

(75) Inventors: Manabu Hanakawa, Matsumoto (JP); Shoji Hinata, Matsumoto (JP)

(73) Assignee: Seiko Epson Corporation (JP)

( * ) Notice: Subject to any disclaimer, the term of this patent is extended or adjusted under 35 U.S.C. 154(b) by 235 days.

(21) Appl. No.: 09/865,046

(22) Filed: May 24, 2001

(65) Prior Publication Data
US 2002/0005928 A1 Jan. 17, 2002

(30) Foreign Application Priority Data

May 25, 2000 (JP) ........................... 2000-154698
Apr. 2, 2001 (JP) ........................... 2001-103494

(51) Int. Cl.[7] ............................................. G02F 1/1343
(52) U.S. Cl. .................... 349/147; 349/114; 349/149
(58) Field of Search ............................. 349/147–149, 349/114, 150, 151, 152

(56) References Cited

U.S. PATENT DOCUMENTS

| 3,814,501 A | | 6/1974 | Schindler | |
|---|---|---|---|---|
| 5,667,853 A | * | 9/1997 | Fukuyoshi et al. | 428/1.62 |
| 6,317,185 B1 | * | 11/2001 | Harano et al. | 349/147 |

FOREIGN PATENT DOCUMENTS

| GB | 0 733 931 A2 | 9/1996 |
|---|---|---|
| JP | 3-29830 | 3/1991 |
| JP | 05-265021 | 10/1993 |
| JP | 07-028055 | 1/1995 |
| JP | 07-098452 | 4/1995 |
| JP | 07-134300 | 5/1995 |
| JP | 07-218923 | 8/1995 |
| JP | 08/262207 | 10/1996 |
| JP | 09-179116 | 7/1997 |
| JP | 09-230806 | 9/1997 |
| JP | 09-236811 | 9/1997 |
| JP | 09-281516 | 10/1997 |
| JP | 09-283866 | 10/1997 |
| JP | 10-239697 | 9/1998 |
| JP | 11/282383 | 10/1999 |
| JP | 11-337974 | 12/1999 |

OTHER PUBLICATIONS

European Search Report dated Jul. 17, 2003.
Examination Results—Japanese Patent Application No. 2001–103494 No translation.
Communication from Taiwan Patent Office re: counterpart application. No translation provided; no figures; no English section. AS Mar. 29, 2004.
Communication from Korean Intellectual Property Office No translation.

\* cited by examiner

*Primary Examiner*—Tarifur R. Chowdhury
*Assistant Examiner*—Andrew Schechter
(74) *Attorney, Agent, or Firm*—Harness, Dickey & Pierce, P.L.C.

(57) ABSTRACT

A liquid crystal device has a configuration including substrates 200 and 300 bonded to each other with a sealant 110 and a liquid crystal 160 enclosed in the gap therebetween. Transparent common electrodes 210 are provided on the inner face of the substrate 200, whereas an underlying film 303, a reflective pattern 312 composed of elemental silver or a silver alloy, and a transparent conductive film 314 deposited on the reflective pattern 312 and patterned so as to come into contact with the underlying film 303 at the edge portion. A segment electrode 310 comprising the reflective pattern 312 and transparent conductive film 314 is arranged so as to perpendicularly cross a common electrode 210.

34 Claims, 19 Drawing Sheets

*Fig. 15a* UNDERLYING FILM DEPOSITION
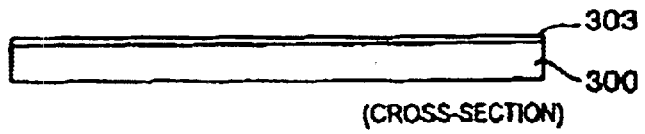
(CROSS-SECTION)
*Fig. 15b* FIRST METAL FILM DEPOSITION
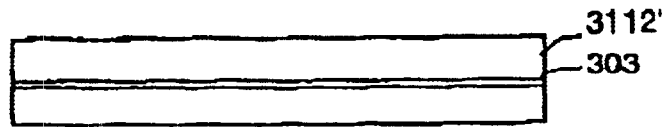
*Fig. 15c* PATTERNING OF FIRST METAL FILM
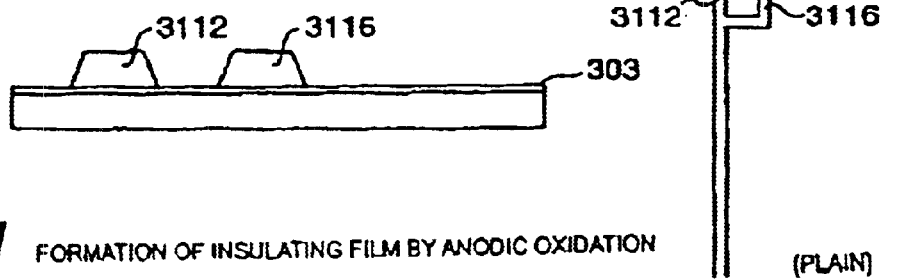
*Fig. 15d* FORMATION OF INSULATING FILM BY ANODIC OXIDATION
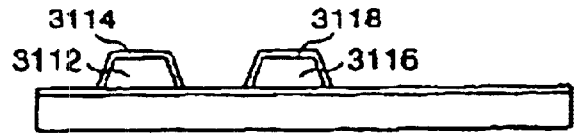
(PLAIN)
*Fig. 15e* ISOLATION OF ELEMENTS
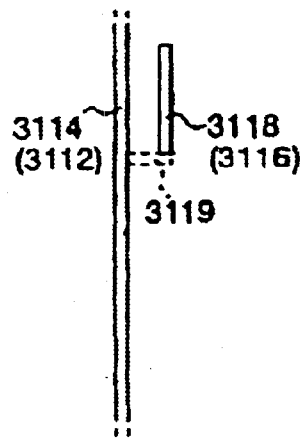

*Fig. 16f* SECOND METAL FILM (SILVER ALLOY) DEPOSITION
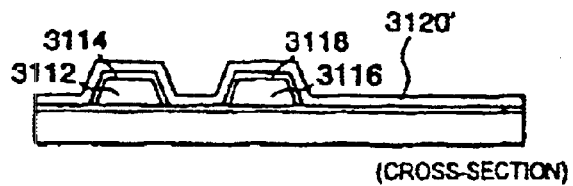
(CROSS-SECTION)
*Fig. 16g* PATTERNING OF SECOND METAL FILM
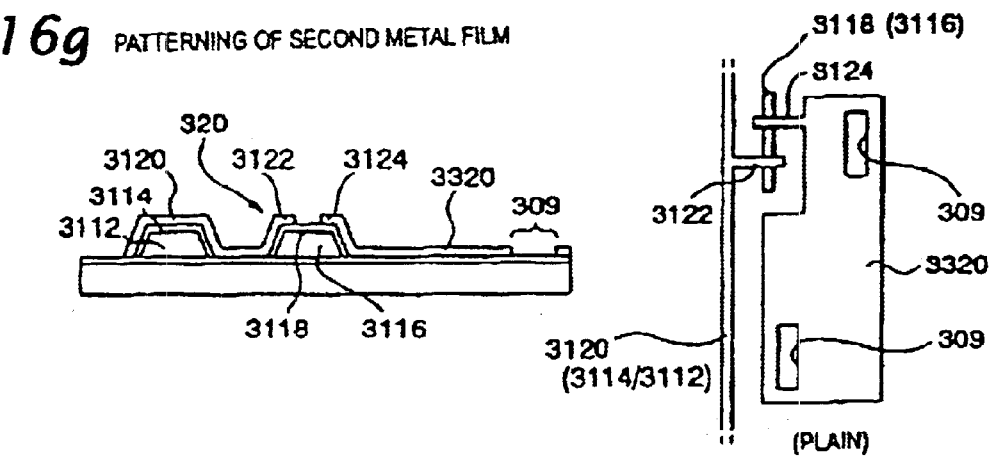
(PLAIN)

Fig. 17h ITO DEPOSITION
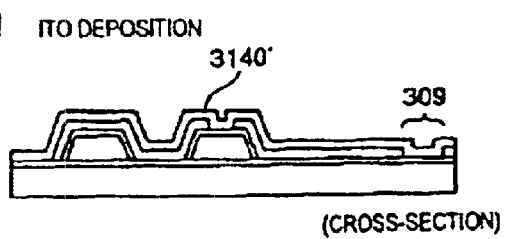
(CROSS-SECTION)
Fig. 17i PATTERNING OF ITO
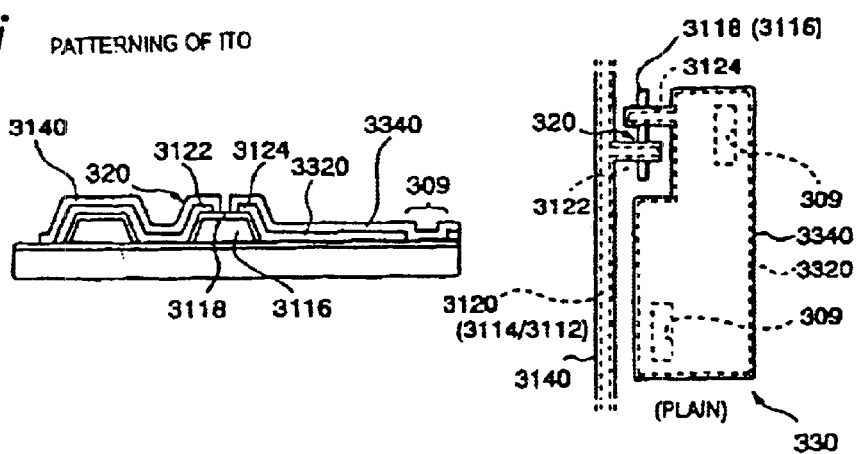

LIQUID CRYSTAL DEVICE HAVING MULTI-LAYER ELECTRODE, METHOD OF MAKING THE SAME, AND ELECTRONIC APPARATUS

BACKGROUND OF THE INVENTION

1. Technical Field of the Invention

The present invention relates to reflective and transflective liquid crystal devices which use silver alloys and the like to reflect light, to a method for making the same, and to electronic apparatuses using the liquid crystal devices as display sections.

2. Description of the Related Art

As is well known, liquid crystal devices do not emit light but performs display by controlling the polarization state of light. Thus, it is necessary that the configuration be such that light is incident on a panel of the liquid crystal device, and in this regard, they are quite different from other display devices, such as electroluminescent devices and plasma display devices.

Incidentally, the liquid crystal devices are classified into two types, that is, a transmissive type having a light source provided behind a panel such that the light passing through the panel can be observed by a viewer, and a reflective type in which a light source is arranged at the front side of the panel (or is not arranged) and the light incident from the front face is reflected by the panel and can be observed by a viewer.

In the transmissive type, the light emitted from the light source provided at the rear side of the panel is introduced to the entire panel through a light guide plate. Then, the light passes through a polarizer, a back substrate, an electrode, a liquid crystal, another electrode, a viewer-side substrate, and another polarizer and is observed by the viewer.

On the other hand, in the reflective type, the light incident on the panel passes through a polarizer, a viewer-side substrate, an electrode, a liquid crystal, and another electrode, is reflected by a reflective film, and passes through the path in the reverse direction, and is observed by a viewer.

As described above, the reflective type needs two paths including an incident path and a reflected path and large optical losses occur in both paths. Compared to the transmissive type, the amount of light from the surrounding environment (external light) is less than that of a light source disposed at the rear side of the panel. Since only a small amount of light is observed by the viewer, the display becomes dim. However, the reflective type also has noticeable advantages, such as high outdoor visibility under sunlight and an ability to display without a light source, compared with the transmissive type. Thus, the reflective liquid crystal display devices are widely used in display sections of portable electronic apparatuses and the like.

The reflective type, however, has a notable disadvantage in that the viewer cannot see the display when insufficient natural illumination is provided from the environment. In recent years, a transflective type has appeared in which a backlight is provided at the rear face of a panel, and a reflective film not only reflects the light incident from the viewer's side but also transmits some of the light from the rear face. This transflective type functions both as a transmissive type by switching on the backlight to ensure visibility of the display when there is insufficient external light and as a reflective type by switching off the backlight in order to reduce power consumption when there is sufficient external light. This means, the transmissive type or the reflective type is selected depending on the intensity of the external light to ensure visibility of the display and to reduce power consumption.

In the reflective type and the transflective type, aluminum has been generally used as a material for the reflective film. However, in recent years, the use of elemental silver or a silver alloy primarily composed of silver (hereinafter referred to as merely "silver alloy") has been investigated to improve reflectance for achieving bright display.

It is not desirable that one electrode used for applying a voltage to the liquid crystal is also used as a reflective layer to simplify the configuration. When this electrode is formed of the silver alloy and the other electrode is formed of a transparent conductive material such as indium tin oxide (ITO) which meets the transparency requirement, irregularity of polarization occurs by sandwiching the liquid crystal with different metals. Furthermore, in a configuration in which only an alignment film is present between the liquid crystal and the silver alloy, impurities in the silver alloy are dissolved into the liquid crystal through the alignment film, and may cause deterioration of the liquid crystal itself.

Thus, the electrode on the substrate provided with the reflective layer cannot be formed of the silver alloy and must be formed of the same transparent conductive material which is used as the electrode of the other substrate. Accordingly, the substrate provided with the reflective layer must use at least two metals, that is, the silver alloy used as the reflective layer and the transparent conductive material as the electrode.

Incidentally, the silver alloy exhibits high conductivity, in addition to high reflectance, and the use thereof as a lead layer of the substrate is being investigated. When the silver alloy used as the reflective layer is also used as the lead layer, the silver alloy must be put into contact with the transparent conductive material used as the electrode for electrical connection therebetween.

Since the silver alloy exhibits poor adhesiveness to other materials, the alloy is damaged by mechanical friction and moisture penetrating from the interface causes corrosion, separation, and the like. As a result, it is difficult to complete a highly reliable liquid crystal display device.

Accordingly, the object of the present invention is to provide a liquid crystal device having high reliability when a silver alloy is used as both a reflective layer and a lead layer, a method for making the same, and an electronic apparatus.

SUMMARY OF THE INVENTION

A liquid crystal device according to an aspect of the present invention comprises a first substrate and a second substrate opposing each other and a liquid crystal enclosed in a gap between the first substrate and the second substrate, and the liquid crystal device further comprises an underlying film provided on the first substrate, a reflective conductive film which is formed on the underlying film and which contains silver, and a metal oxide film which is deposited on the reflective conductive film and which is patterned so that the edge portion of the metal oxide film comes into contact with the underlying film. According to this configuration, the reflective conductive film is covered by the metal oxide film and the metal oxide film is patterned so that the edge portion thereof comes into contact with the underlying film; hence, the surface of the reflective conductive film is not exposed after the metal oxide film is formed. Thus, the reliability of the reflective conductive film containing silver is improved.

Preferably, the underlying film comprises a metal oxide. The reflective conductive film is thereby sandwiched by the two metal oxides. Since the metal oxides have high adhesiveness, moisture barely penetrates into the reflective conductive film through the interface between the underlying film containing the metal oxide and the metal oxide film deposited on the reflective conductive film.

Incidentally, the reflectance vs. wavelength relationship of the reflective conductive film containing silver is not so flat as that of aluminum (Al) which is generally used, and tends to decrease at the shorter wavelength end (see to FIG. 7). As a result, the light reflected by the reflective conductive film less contains the blue light component and thus is yellowish. Thus, a reflective layer reflecting blue light is preferably provided on the upper face of the reflective conductive film. As a result of such a configuration, large amounts of blue light components are reflected by the reflective layer before the blue light component is reflected by the reflective conductive film, preventing that all light reflected by the reflective layer and the reflective conductive film containing silver is yellowish.

Since an electronic apparatus in one aspect of the present invention is provided with the above liquid crystal device, reliability of the device is improved.

A liquid crystal device according to an aspect of the present invention comprises a first substrate and a second substrate opposing each other and a liquid crystal enclosed in a gap between the first substrate and the second substrate, and the liquid crystal device further comprises a first lead provided on the first substrate, a conductive film provided on the second substrate, and a conductive material connecting the first lead and the conductive film, wherein the first lead comprises an underlying film, a metal film which is formed on the underlying film and which contains silver, and a metal oxide film which is deposited on the metal film and which is patterned so that the edge portion of the metal oxide film comes into contact with the underlying film. Since the conductive film provided on the second substrate is connected to the first lead provided on the first substrate through the conductive material according to this configuration, all leads are arranged on the first substrate. Since the first substrate has the metal film containing silver, the resistance thereof is decreased. In addition, the metal film containing silver is covered by the metal oxide film and the metal oxide film is patterned so that the edge portion thereof comes into contact with the underlying film; hence, the surface of the metal film is not exposed after the metal oxide film is formed. Thus, the reliability of the metal film containing silver is improved.

In this configuration, the underlying film preferably comprises a metal oxide, because moisture barely penetrates into the reflective conductive film as described above. Preferably, the metal film is formed at a portion other than the connection to the conductive material. Since the silver alloy has poor adhesiveness, it is undesirable to provide the silver alloy at a portion in which stress is applied.

Preferably, the liquid crystal device further comprises a pixel electrode provided on the first substrate, an active element connected to the pixel electrode at one end of the active element, a signal line provided on the first substrate and connected to the first lead to apply a voltage to the liquid crystal, wherein the signal line is connected to the other end of the active element. According to this configuration, the pixel electrode is independently driven by the active element.

Preferably, the liquid crystal device further comprises a driver IC chip for driving the liquid crystal, wherein the driver IC chip comprises an output bump for supplying an output signal to the first lead, and the output bump is connected to the first lead. By mounting the driver IC chip for supplying the output signal to the first lead, the number of the connections to an external circuit can be reduced.

When the driver IC chip is mounted, the metal film of the first lead is preferably formed at a portion other than the connection to the output bump. Since the silver alloy exhibits poor adhesiveness, it is undesirable to provide the silver alloy at a portion in which stress is applied. In particular, when the substrate is detached from the first substrate to repair the driver IC chip, separation of the metal film containing silver may occur.

The liquid crystal device preferably further comprises a second lead provided on the first substrate and a driver IC chip for driving the liquid crystal, wherein the driver IC chip comprises an input bump for inputting an input signal from the second lead, the input bump is connected to the second lead, and the second lead comprises an underlying film, a metal film which is formed on the underlying film and which contains silver, and a metal oxide film which is deposited on the metal film and which is patterned so that the edge portion of the metal oxide film comes into contact with the underlying film. Since the second lead has the metal film containing silver according to this configuration, the resistance of the second lead is reduced and the surface of the metal film is not exposed, high reliability is achieved. When an driver IC chip is mounted, the metal film of the second lead is preferably formed at a portion other than the connection to the input bump, in order to prevent separation of the metal film containing silver when the driver IC chip is repaired.

Moreover, the liquid crystal device preferably further comprises an external circuit board for supplying an input signal to the driver IC chip, wherein the external circuit board and the second lead are connected to each other, and the metal film is formed at a portion other than the connection to the external circuit board. This configuration prevents separation of the metal film containing silver when the external circuit board is repaired.

A liquid crystal device according to an aspect of the present invention comprises a first substrate and a second substrate opposing each other and a liquid crystal enclosed in a gap between the first substrate and the second substrate, and the liquid crystal device further comprises an electrode provided on the first substrate for supplying a voltage to the liquid crystal, a first lead connected to the electrode, and a driver IC chip connected to the first lead, wherein the first lead comprises an underlying film, a metal film which is formed on the underlying film and which contains silver, and a metal oxide film which is deposited on the metal film and which is patterned so that the edge portion of the metal oxide film comes into contact with the underlying film. Since the first lead includes the metal film containing highly conductive silver in such a configuration, the resistance thereof is reduced. Moreover, the metal film containing silver is covered by the metal oxide film and the edge portion of the metal oxide film is patterned so as to come into contact with the underlying film. Thus, the surface of the metal film is not exposed after the metal oxide film is formed. Accordingly, the reliability of the metal film containing silver is improved.

Preferably, the metal film is formed at a portion other than the connection to the driver IC chip, in order to prevent separation of the metal film containing silver when the driver IC chip is repaired.

Preferably, the liquid crystal device further comprises a second lead provided on the first substrate, wherein the driver IC chip comprises an input bump for inputting an input signal from the second lead, the input bump is connected to the second lead, and the second lead comprises an underlying film, a metal film which is formed on the underlying film and which contains silver, and a metal oxide film which is deposited on the metal film and which is patterned so that the edge portion of the metal oxide film comes into contact with the underlying film. According to this configuration, the resistance of the second lead, in addition to the first lead, is reduced, and the surface of the metal film containing silver is prevented from exposure.

Also, in this configuration, the liquid crystal device preferably further comprises an external circuit board for supplying an input signal to the second lead, wherein the metal film is formed at a portion other than the connection to the external circuit board, in order to prevent separation of the metal film containing silver when the driver IC chip is repaired.

A liquid crystal device according to an aspect of the present invention comprises a first substrate and a second substrate opposing each other and a liquid crystal enclosed in a gap between the first substrate and the second substrate, and the liquid crystal device further comprises a lead provided on the first substrate, wherein the lead comprises an underlying film, a metal film formed on the underlying film, and a metal oxide film deposited on the metal film.

In this liquid crystal device, preferably, the underlying film comprises a metal oxide, and the metal film comprises elemental silver or a silver alloy. Preferably, the liquid crystal device further comprises a first extending region which is provided at one side of the first substrate and which does not overlap the second substrate, and a second extending region which is provided at a side crossing said one side of the first substrate and which does not overlap the second substrate, wherein the lead is provided over the first extending region and the second extending region.

A liquid crystal device according to an aspect of the present invention comprises a first substrate and a second substrate opposing each other and a liquid crystal enclosed in a gap between the first substrate and the second substrate, and the liquid crystal device further comprises: an underlying film provided on the first substrate, a reflective conductive film which is formed on the underlying film and which contains silver, a first transparent electrode deposited on the reflective conductive film and comprising a metal oxide film which is patterned so that the edge portion of the first transparent electrode comes into contact with the underlying film, a second transparent electrode provided on the second substrate, and a transflective portion provided corresponding to the crossing between the first transparent electrode and the second transparent electrode. According to this configuration, a transflective type device is achieved while the reliability of the reflective conductive film containing silver is ensured.

A liquid crystal device according to an aspect of the present invention comprises a first substrate and a second substrate opposing each other and a liquid crystal enclosed in a gap between the first substrate and the second substrate, and the liquid crystal device further comprises an underlying film provided on the first substrate, a reflective conductive film which is formed on the underlying film and which contains silver, a first transparent electrode deposited on the reflective conductive film and comprising a metal oxide film which is patterned so that the edge portion of the reflective conductive film comes into contact with the underlying film, a second transparent electrode provided on the second substrate, and a color layer provided corresponding to a crossing between the first transparent electrode and the second transparent electrode. This configuration enables color displaying while the reliability of the reflective conductive film containing silver is ensured.

In accordance with an aspect of the present invention, in a method for making a liquid crystal device which comprises a first substrate and a second substrate opposing each other and a liquid crystal enclosed in a gap between the first substrate and the second substrate, the method comprises the steps of forming an underlying film on the first substrate, forming a reflective conductive film containing silver on the underlying film, and forming a metal oxide film on the reflective conductive film so that the edge portion of the reflective conductive film comes into contact with the underlying film. According to this method, the reflective conductive film is covered by the metal oxide film and the edge portion of the metal oxide film is formed so as to come into contact with the underlying film. Thus, the surface of the reflective conductive film is not exposed, improving the reliability of the reflective conductive film containing silver.

In this method, the underlying film preferably comprises a metal oxide. Moisture or the like barely penetrates into the reflective conductive film.

Preferably, the method further comprises the step of simultaneously patterning the underlying film and the metal oxide film. This method contributes to a reduction in manufacturing step.

BRIEF DESCRIPTION OF THE DRAWINGS

FIGS. 15(a) to (e) are cross-sectional views illustrating a manufacturing process of a back substrate in the liquid crystal panel.

FIGS. 16(f) and 16(g) are cross-sectional views illustrating the manufacturing process of the back substrate in the liquid crystal panel.

FIGS. 17(h) and (i) are cross-sectional views of the manufacturing process of the back substrate in the liquid crystal panel.

DETAILED DESCRIPTION OF THE PREFERRED EMBODIMENTS

The embodiments of the present invention will now be described with reference to the drawings.

Figure 1:
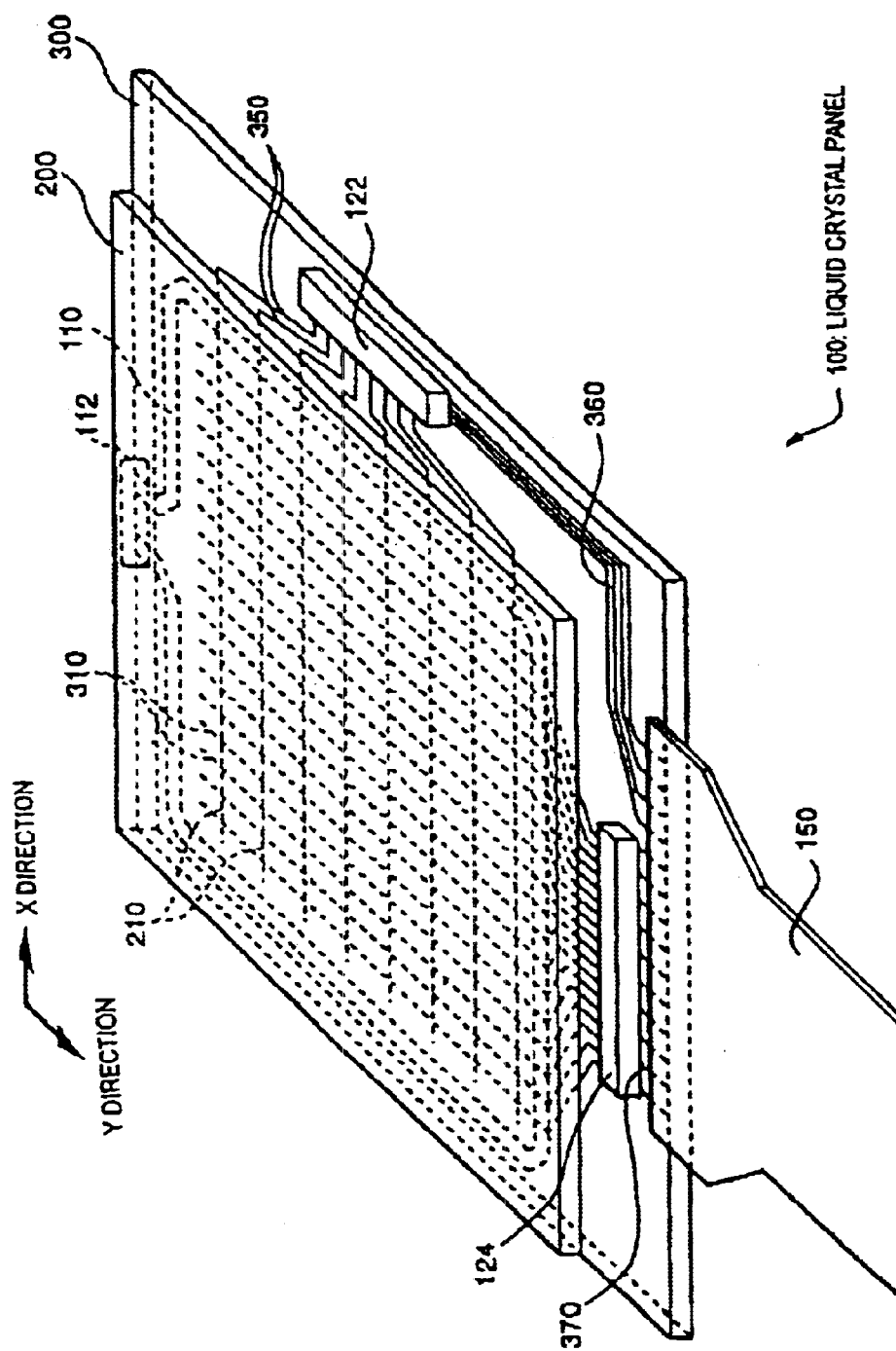
FIG. 1 is an isometric view illustrating an overall configuration of a liquid crystal display device in accordance with a first embodiment.
Figure 2:
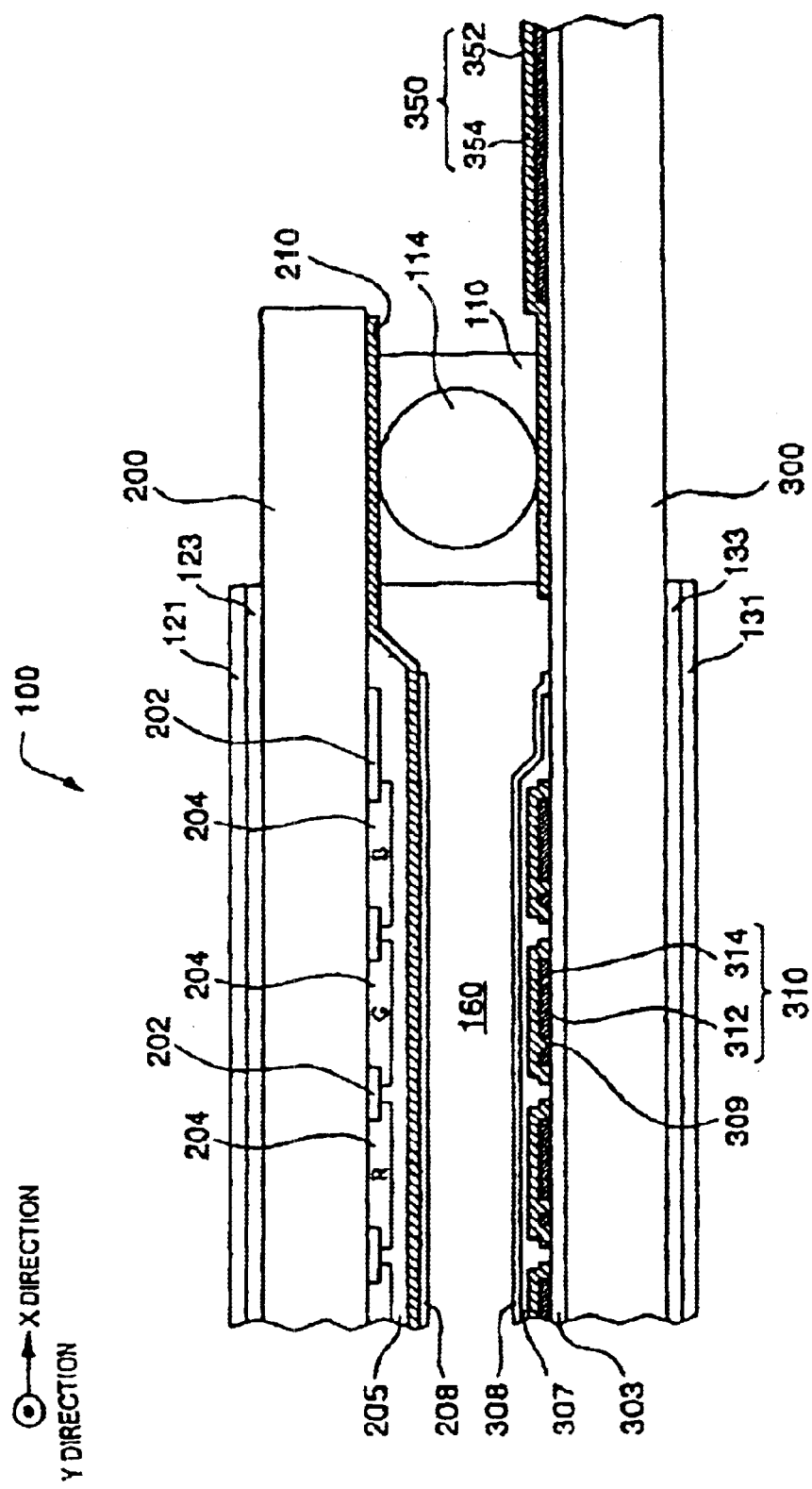
FIG. 2 is a partial cross-sectional view when a liquid crystal panel constituting the liquid crystal display device is broken along the X direction in FIG. 1.

A liquid crystal device in accordance with a first embodiment of the present invention will now be described. This liquid crystal device is of a transflective type which functions as a reflective type when external light is sufficient and as a transmissive type by switching on a backlight when the external light is insufficient. FIG. 1 is an isometric view illustrating a configuration of a liquid crystal panel in the liquid crystal display device, and FIG. 2 is a partial cross-sectional view when the liquid crystal panel is broken along the X direction in FIG. 1.

As shown in these drawings, the liquid crystal panel 100 constituting the liquid crystal display device includes a front substrate 200 lying at the viewer side and a back substrate 300 lying at the back side, these substrates being bonded to each other at a predetermined gap with a sealant 110 which contains conductive particles 114 and also functions as a spacer. This gap is filled with, for example, a twisted nematic (TN) liquid crystal 160. The sealant 110 is formed on either substrate to form a frame along the peripheries of the inner face of the front substrate 200 and has an opening for enclosing the liquid crystal 160. This opening is sealed with a sealant 112 after the liquid crystal is enclosed.

A plurality of common (scanning) electrodes 210 extends in the X (line) direction on the inner face, opposing the back substrate 300, of the front substrate 200, whereas a plurality of segment (data) electrodes 310 extends in the Y (row) direction on the inner face of the back substrate 300. In this embodiment, a voltage is applied to the liquid crystal 160 through these electrodes at regions in which the common electrodes 210 and the segment electrodes 310 cross each other, and these crossing regions function as sub-pixels.

In the back substrate 300, a driver IC chip 122 for driving the common electrodes 210 and a driver IC chip 124 for driving the segment electrodes 310 are mounted on two sides which protrude from the front substrate 200 by a chip-on-glass (COG) technology, as described below. At the exterior of the region for mounting the driver IC chip 124 in these two sides, a flexible printed circuit (FPC) board 150 is bonded.

Each common electrode 210 formed on the front substrate 200 is connected to one end of each lead (first lead) 350 which is formed on the back substrate 300, via conductive particles 114 contained in the sealant 110. On the other hand, the other end of the lead 350 is connected to an output bump (protruding electrode) of the driver IC chip 122. That is, the driver IC chip 122 supplies common signals through the leads 350, the conductive particles 114, and the common electrodes 210 in that order. Input bumps of the driver IC chip 122 and the FPC board (external circuit board) 150 are connected to each other with leads (second leads) 360.

The segment electrodes 310 formed on the back substrate 300 are connected to the output bump of the driver IC chip 124. That is, the driver IC chip 124 directly supplies segment signals to the segment electrodes 310. The input bump of the driver IC chip 124 and the FPC board 150 are connected with leads (second leads) 370.

As shown in FIG. 2, in the liquid crystal panel, a polarizer 121 and a retardation film 123 are provided on the proximal side (viewer side) of the front substrate 200. Furthermore, a polarizer 131 and a retardation film 133 are provided on the back side (away from the viewer) of the back substrate 300 (not shown in FIG. 1). In addition, a backlight (not shown in these drawings) is provided behind the back substrate 300 so that the liquid crystal device is used as a transmissive type when the external light is insufficient.

A display region in the liquid crystal panel 100 will now be described in detail. The front substrate 200 will be described in detail. As shown in FIG. 2, the retardation film 123 and the polarizer 121 are bonded onto the outer face of the front substrate 200. The inner face of the front substrate 200 is provided with a shading film 202 to prevent color mixing between sub-pixels and to function as a frame defining the display region. Moreover, color filters 204 are arranged into a predetermined array corresponding to crossing regions between the common electrodes 210 and the segment electrodes 310 (corresponding to openings of the shading film 202). In this embodiment, red (R), green (G), and blue (B) color filters 204 have a stripe arrangement which is suitable for displaying data (see FIG. 3), and three R, G, and B sub-pixels constitute one substantially square pixel. However, the present invention is not limited to this configuration.

A planarization film 205 formed of an insulating material planarizes steps between the shading film 202 and the color filters 204, and a plurality of strip common electrodes 210 composed of a transparent conductive material such as ITO is patterned on the planarized plane. An alignment film 208 composed of polyimide or the like is formed on the common electrodes 210. The alignment film 208 is subjected to rubbing treatment in a predetermined direction before bonding with the back substrate 300. Since the shading film 202, the color filters 204, and the planarization film 205 are unnecessary in regions other than the display region, these are not provided in the vicinity of the region of the sealant 110.

The configuration of the back substrate 300 will now be described. The retardation film 133 and the polarizer 131 are bonded to the outer face of the back substrate 300. Furthermore, an underlying film 303 having insulation and transparency is formed on the entire inner face of the back substrate 300. In addition, stripped segment electrodes 310, each composed of a laminate of a reflective pattern 312 and a transparent conductive film 314, are formed on the surface of the underlying film 303.

Among these, the reflective pattern 312 is formed of a silver alloy, reflects light incident on the front substrate 200 towards the front substrate 200. Preferably, the reflective pattern 312 has a surface causing irregular reflection rather than a complete mirror surface. Although the reflective pattern 312 is preferably formed so as to have an uneven surface to some extent, the description thereof is omitted in the present invention since the description does not relates to the present invention directly. The reflective pattern 312 is provided with two openings 309 per one sub-pixel for transmitting light from the backlight so that the device can be used also as a transmissive type (see FIG. 3). The underlying film 303 provided on the back substrate 300 improves adhesiveness of the reflective pattern 312 to the back substrate 300.

The transparent conductive films 314 are formed so as to be one size larger than the reflective pattern 312 and, in detail, so as to come into contact with the underlying film 303 at the edge (peripheral) portion protruding from the reflective pattern 312. Since the surface of the reflective pattern 312 is completely covered by the transparent conductive film 314, the reflective patterns 312 are not exposed to any portions including the openings 309.

A protective film 307 is formed of, for example, $TiO_2$, protects the segment electrodes 310 including the reflective patterns 312 and the transparent conductive films 314, and reflects large amounts of blue light components (as a reflective layer). The protective film 307 is provided with an alignment film 308 of polyimide or the like thereon. The alignment film 308 is subjected to rubbing treatment in a predetermined direction before bonding with the front substrate 200. A manufacturing process of the back substrate 300 will be described after leads 350, 360, and 370 are described.

Figure 3:
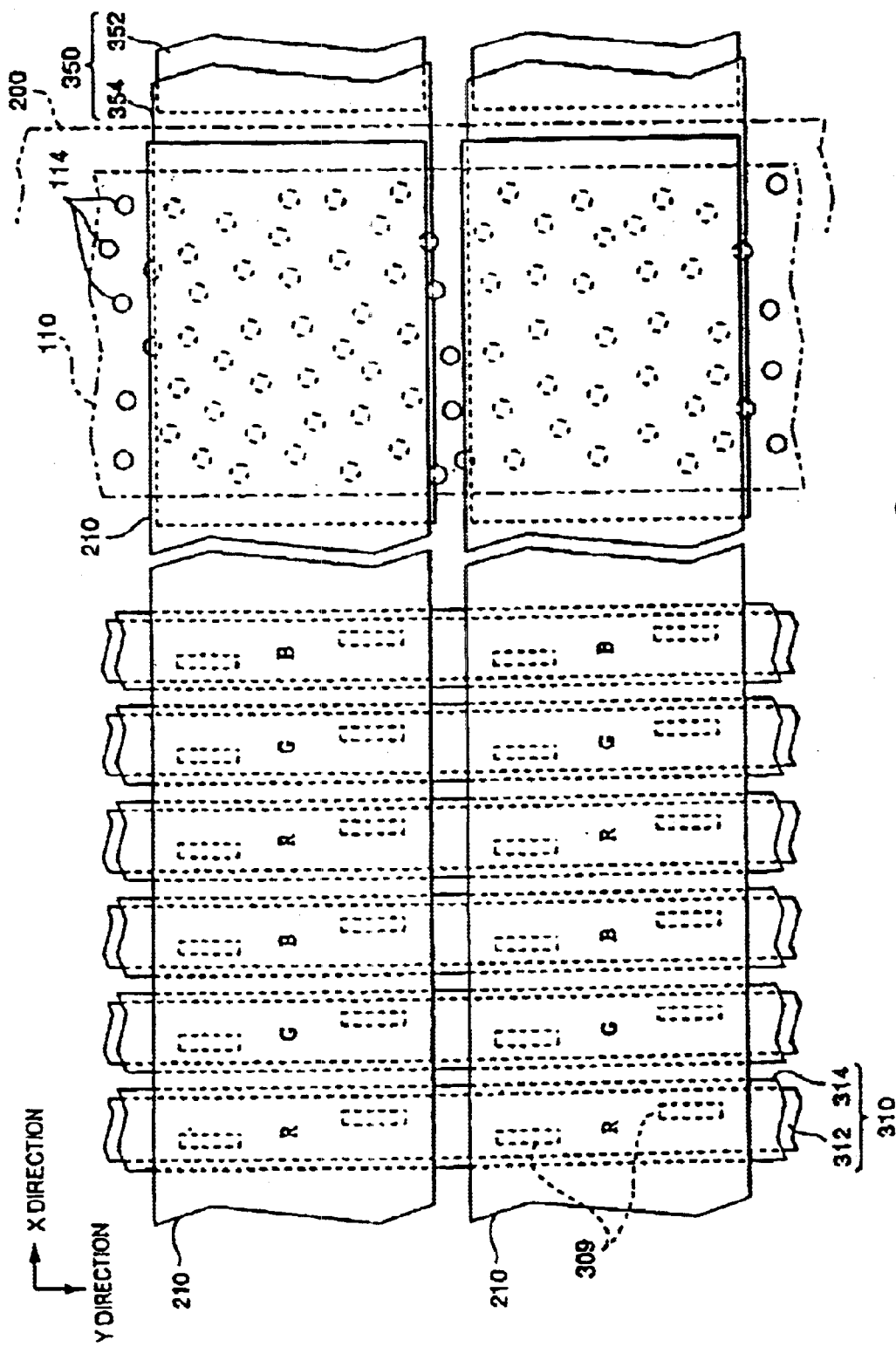
FIG. 3 is a plan view of a pixel configuration in the liquid crystal panel.

The vicinity of the region for forming the sealant 110 in the liquid crystal panel 100 will be described with reference to FIG. 3 in addition to FIG. 2. FIG. 3 is a plan view of a detailed configuration in the vicinity of this region.

As shown in these drawings, the common electrodes 210 on the front substrate 200 extend to the region of the sealant 110, whereas transparent conductive films 354 constituting the leads 350 extend to the region of the sealant 110 on the back substrate 300 so as to face the common electrodes 210. Thus, given amounts of spherical conductive particles 114 dispersed in the sealant 110 function as spacers and electrically connect the common electrodes 210 and the corresponding transparent conductive films 354.

Herein, each lead 350 electrically connects the corresponding common electrode 210 and the output bump of the driver IC chip 122 and has a laminate configuration of a reflective conductive film 352 and the corresponding transparent conductive film 354. The reflective conductive films 352 are formed by patterning the conductive layer which is the same as that for the reflective pattern 312. The transparent conductive films 354 are formed by patterning the conductive layer which is the same as that for the transparent conductive films 314 such that the transparent conductive films 354 are one size larger than the reflective conductive films 352 and particularly edge portions protruding from the reflective conductive films 352 come into contact with the underlying films 303. As shown in FIG. 2, the reflective conductive films 352 are not formed and only the transparent conductive films 354 are formed in the region for forming the sealant 110. In other words, the reflective conductive films 352 are formed in regions other than connections with the common electrodes 210 in the region for forming the sealant 110.

The diameter of the conductive particle 114 in FIG. 2 is larger than the actual size for description and only one particle is depicted in the width direction of the sealant 110. In the actual configuration, however, many conductive particles 114 are arranged at random in the width direction of the sealant 110.

Figure 4:
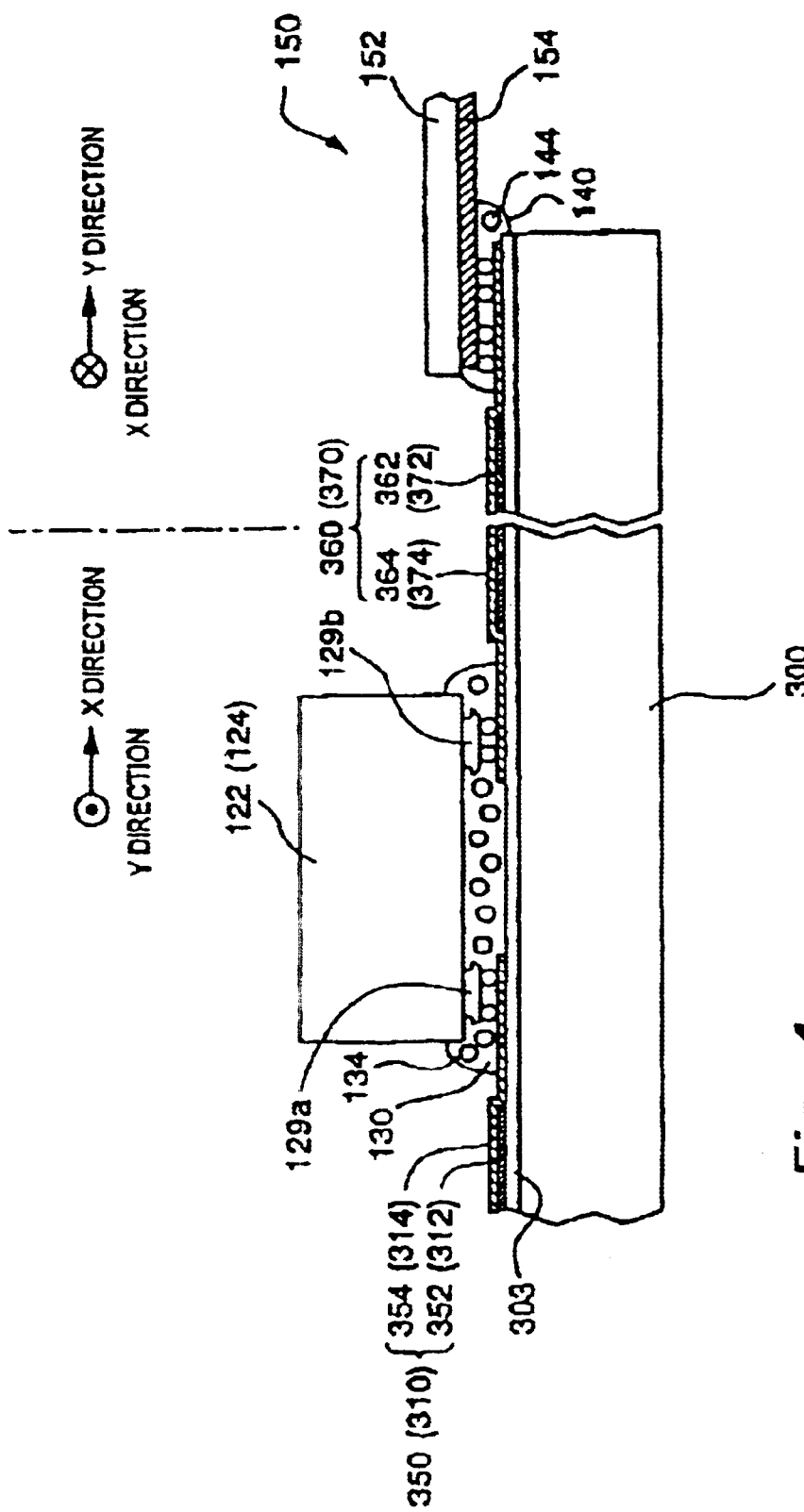
FIG. 4 is a partial cross-sectional view in the vicinity of a region for mounting a driver IC chip in the liquid crystal panel.
Figure 5:
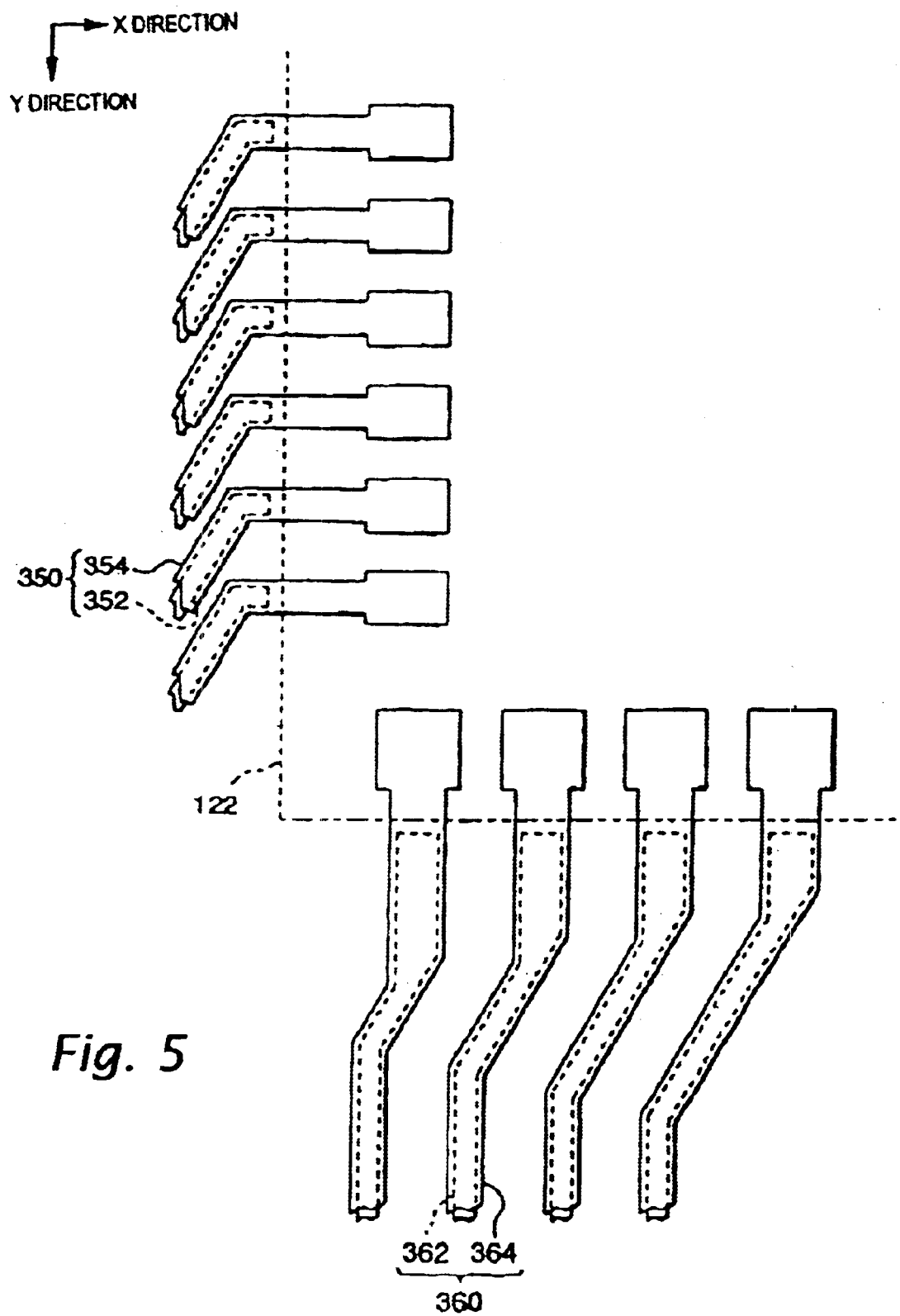
FIG. 5 is a partial plan view in the vicinity of a region for mounting the driver IC chip in a back substrate of the liquid crystal panel.
Figure 6A:
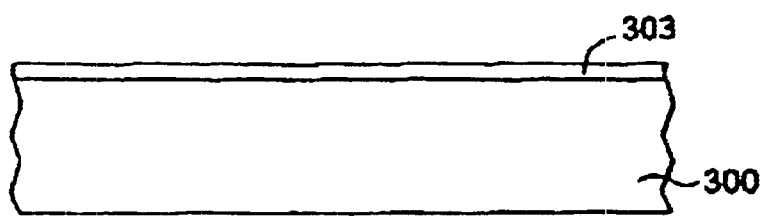
FIGS. 6(a) to 6(e) are cross-sectional views of a manufacturing process of the back-side substrate in the liquid crystal panel.
Figure 6B:
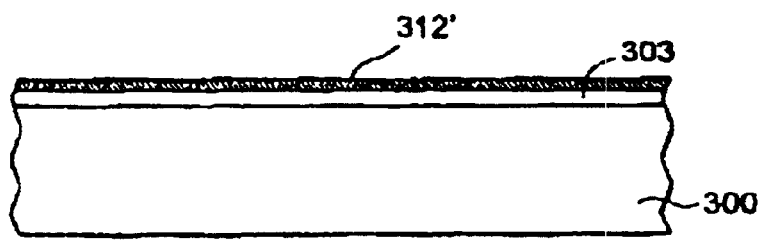
Figure 6C:
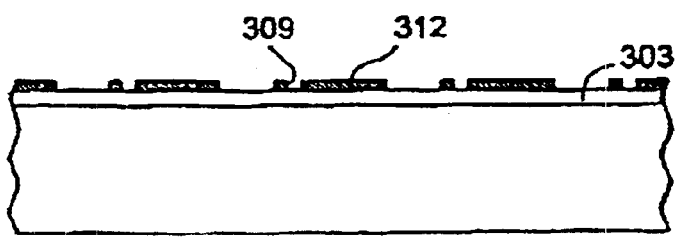
Figure 6D:
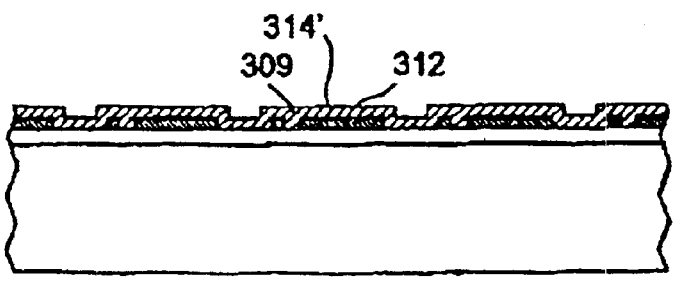
Figure 6E:
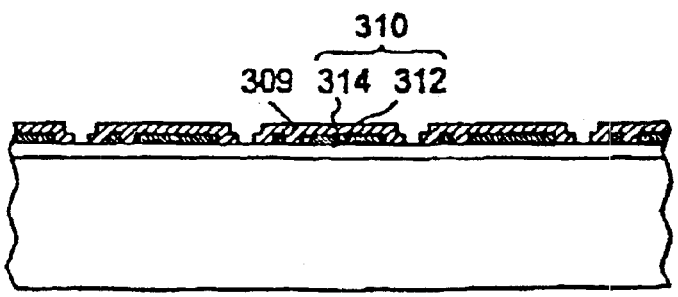

Next, regions for mounting the driver IC chips 122 and 124 and the vicinity of a region for connecting the FPC board 150 in the back substrate 300 will be described. FIG. 4 is a cross-sectional view which primarily illustrates leads among configurations of these regions, and FIG. 5 is a plan view which illustrates the lead configuration in the region for mounting the driver IC chip 122. Although, the back substrate 300 is provided with the leads 350, 360 and 370, as well as the segment electrodes 310, as described above, only the leads 350 and 360 relating to the driver IC chip 122 will be described in this embodiment.

As shown in these drawings, the leads 350 for supplying the common signal from the driver IC chip 122 to the common electrodes 210 are composed of a laminate film including the reflective conductive films 352 and the transparent conductive films 354. The region for mounting the driver IC chip 122, however, includes only the transparent conductive film 354 and does not include the reflective conductive film 352. In other words, the reflective conductive film 352 is formed at a portion other than the connection to the driver IC chip 122.

Each lead 360 for supplying various signals, fed from the FPC board 150, to the driver IC chip 122 is also composed of a laminate film including a reflective conductive film 362 and a transparent conductive film 364. The reflective conductive film 362 is formed by patterning the conductive layer which is the same as the layer for the reflective pattern 312 and the reflective conductive film 352. The transparent conductive film 364 is formed by patterning the conductive layer which is the same as the layer for the transparent conductive films 314 and 354 such that the transparent conductive film 364 is one size larger than the reflective conductive film 362 and more specifically such that the edge portion of the transparent conductive film 364 protruding from the reflective conductive film 362 comes into contact with the underlying films 303. The region for mounting the driver IC chip 122 and the region (not shown in FIG. 5) for bonding the FPC board 150 of the leads 360 are provided with only the transparent conductive film 364 and not provided with the reflective conductive film 362. In other words, the transparent conductive film 364 is formed at a portion other than the connections to the driver IC chip 122 and the FPC board 150.

The driver IC chip 122 is COG-mounted to the leads 350 and 360, for example, by the following process. A plurality of electrodes is provided at the periphery of a face of the rectangular parallelepiped driver IC chip 122. A bump 129a or 129b composed of, for example, gold (Au) is preliminarily formed to each electrode. Then, an anisotropic conductive sheet of an adhesive 130, such as an epoxy adhesive, containing uniformly dispersed conductive particles 134 is placed onto the region for mounting the driver IC chip 122 on the back substrate 300. The anisotropic conductive sheet is sandwiched by the driver IC chip 122 in which the face provided with the electrodes is arranged at the inner side and the back substrate 300. After the driver IC chip 122 is positioned, pressure and heat are applied to the back substrate 300 via the anisotropic conductive sheet.

As a result, in the driver IC chip 122, the output bump 129*a* which supplies the common signal and the input bump 129*b* which receives signals from the FPC board 150 are electrically connected to the transparent conductive films 354 constituting the leads 350 and the transparent conductive films 364 constituting the leads 360, respectively, via the conductive particles 134 in the adhesive 130. The adhesive 130 also functions as a sealant which protects the electrode-forming-face of the driver IC chip 122 from moisture, contamination, stress, etc.

The leads 350 and 360 relating to the driver IC chip 122 are exemplified above. The segment electrodes 310 relating to the driver IC chip 124 and the leads 370 supplying various signals fed from the FPC board 150 to the driver IC chip 124 have substantially the same configurations as those of the leads 350 and 360, as shown in parentheses in FIG. 4.

That is, the segment electrodes 310 for supplying the segment signals from the driver IC chip 124 are formed of laminate films of the reflective conductive film 312 and the transparent conductive film 314, as described above. In the region for mounting the driver IC chip 124, only the transparent conductive film 314 is provided and the reflective pattern 312 is not provided. In other words, the reflective pattern 312 is provided at a portion other than the connection to the driver IC chip 124.

Similarly, each of the leads 370 for supplying various signals fed from the FPC board 150 to the driver IC chip 124 is composed of a laminate of a reflective conductive film 372 and a transparent conductive film 374. The reflective conductive film 372 is formed by patterning the same conductive layer as that for the reflective patterns 312 and the reflective conductive films 352 and 362. The transparent conductive film 374 is formed by patterning the same conductive layer as that for the transparent conductive films 314, 354, and 364 such that the transparent conductive film 374 is one size larger than the reflective conductive film 372 and the edge thereof protruding from the reflective conductive film 372 comes into contact with the underlying film 303. In the region for mounting the driver IC chip 124 and the region for bonding the FPC board 150, only the transparent conductive film 374 of the lead 370 is provided and the reflective conductive film 372 is not provided. In other words, the reflective conductive film 372 is formed at a portion other than the connection to the driver IC chip 124 and the connection to the FPC board 150.

The segment electrodes 310 and the leads 370 are connected to the driver IC chip 124 via the anisotropic conductive sheet, as in the driver IC chip 122.

The anisotropic conductive sheet is also used for connection of the FPC board 150 to the leads 360 and 370. A lead 154 formed on a substrate 152 of polyimide or the like of the FPC board 150 is electrically connected to the transparent conductive film 364 constituting the lead 360 and the transparent conductive film 374 constituting the lead 370 via conductive particles 144 in an adhesive 140.

A manufacturing process of the above liquid crystal device and particularly of the back substrate will be described with reference to FIG. 6. The description is mainly focused to the region in which the common electrodes 210 and the segment electrodes 310 cross each other.

As shown in FIG. 6(*a*), $Ta_2O_5$, $SiO_2$, or the like is deposited on the entire inner face of a back substrate 300 by sputtering to form an underlying film 303. As shown in FIG. 6(*b*), a reflective conductive layer 312' composed of elemental silver or primarily composed of silver is deposited by sputtering or the like. The conductive layer 312' is composed of, for example, an alloy containing approximately 98% silver (Ag), platinum (Pt), and copper (Cu) by weight, a silver-copper-gold alloy, or a silver-ruthenium (Ru)-copper alloy, in this embodiment.

Then, as shown in FIG. 6(*c*), the conductive layer 312' is patterned by photolithographic and etching processes to form the reflective patterns 312 in the display region and the reflective conductive films 352, 362, and 372 in regions other than the display region. Openings 309 are also formed in the reflective patterns 312.

As shown in FIG. 6(*d*), a conductive layer 314' composed of ITO or the like is deposited by sputtering or the like. Then, as shown in FIG. 6(*e*), the conductive layer 314' is patterned by photolithographic and etching processes to form the transparent conductive films 314 in the display region and the transparent conductive films 354, 364, and 374 in other regions. Herein, the peripheries of the transparent conductive films 314, 354, 364, and 374 are put into contact with the underlying film 303 so that the reflective pattern 312 and the reflective conductive films 352, 362, and 372 are not exposed. Since the surfaces of the reflective patterns 312 and the reflective conductive films 352, 362, and 372 are thereby not exposed after the conductive layer 314' is deposited, these layers are prevented from corrosion and separation. Furthermore, the transparent conductive films 314 disposed between the liquid crystal 160 and the reflective patterns 312 prevents migration of impurities from the reflective patterns 312 to the liquid crystal 160.

Although not shown in the drawing, the protective film 307 and the alignment film 308 shown in FIG. 2 are formed in that order and the alignment film 308 is subjected to rubbing treatment in the subsequent steps. The resulting back substrate 300 and a front substrate 200 having a rubbing-treated alignment film 208 are bonded to each other with a sealant 110 containing dispersed conductive particles 114. A liquid crystal 160 is dropwise supplied to the opening of the sealant 110 under vacuum. After the pressure is backed to normal pressure so that the liquid crystal 160 spreads over the entire panel, the opening is sealed with a sealant 112. As described above, the driver IC chips 122 and 124 and the FPC board 150 are mounted to complete the liquid crystal panel 100 shown in FIG. 1.

The display operation of the liquid crystal device in accordance with such a configuration will be described in brief. The driver IC chip 122 applies a selection voltage to common electrodes 210 in a predetermined order every horizontal scanning period, while the driver IC chip 124 supplies segment signals corresponding to the display information of one sub-pixel line which lies at these common electrodes 210 to the corresponding segment electrodes 310. The alignment of the liquid crystal 160 in the sub-pixels in this region is independently controlled based on the differences between the voltages applied to the common electrodes 210 and the voltages applied to the segment electrodes 310.

With reference to FIG. 2, the external light from the viewer passes through the polarizer 121 and the retardation film 123 to be polarized to a predetermined state. The light passes through the front substrate 200, the color filters 204, the common electrodes 210, the liquid crystal 160, and the segment electrodes 310, and reaches the reflective pattern 312. The light is reflected thereby and passes through the above route backward. Thus, the amount of the light which is reflected by the reflective pattern 312, passes through the polarizer 121, and is visible by the viewer is independently controlled in each sub-pixel in response to a change in alignment of the liquid crystal 160 which is caused by the differences between the voltage applied to the corresponding common electrode 210 and the voltage applied to the corresponding segment electrode 310.

Figure 7:
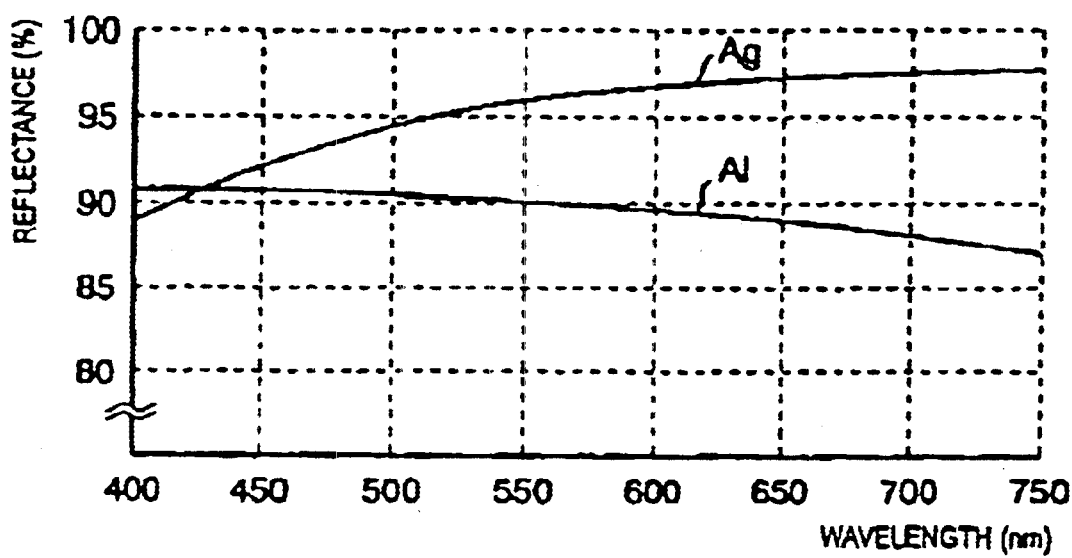
FIG. 7 is a graph illustrating reflectance characteristics of silver and aluminum.

In the reflective type, a larger amount of shorter-wavelength (blue) light is reflected by the protective film 307 which lies above the reflective pattern 312 rather than by the reflective pattern 312. The reason for providing the protective film 307 in this embodiment is as follows. As shown in FIG. 7, the reflectance-vs.-wavelength pattern of the reflective pattern 312 containing silver in this embodiment is not so flat as that of aluminum which is generally used, and tends to decrease at the shorter wavelength end. As a result, the light reflected by the reflective patterns 312 less contains blue light components and thus is yellowish, adversely affecting color reproducibility in color displaying. Thus, the protective film 307 is provided so that large amounts of blue light components are reflected by the protective film 307 rather than by the reflective pattern 312. This configuration prevents all light reflected by the protective film 307 and the reflective pattern 312 from becoming yellowish.

When a backlight (not shown in the drawing) lying at the rear face of the back substrate 300 is turned on, the light from the backlight passes through the polarizer 131 and the retardation film 133 and is polarized to a predetermined state. The light further passes through the back substrate 300, the openings 309, the segment electrodes 310, the liquid crystal 160, the common electrodes 210, the front substrate 200, and the polarizer 121, and is emitted towards the viewer. Thus, also, in the transmissive type, the amount of the light which passes through the openings 309 and the polarizer 121 and is observed by the viewer is independently controlled in each sub-pixel by a change in alignment of the liquid crystal 160 which is caused by the difference between the voltage applied to the corresponding common electrode 210 and the voltage applied to the corresponding segment electrode 310.

Since the liquid crystal display device in accordance with this embodiment functions as a reflective type when the external light is sufficient and a transmissive type by switching on the backlight when the external light is insufficient, and thus can perform display in both types. Since the reflective patterns 312 reflecting the light are composed of elemental silver or a silver alloy primarily containing silver to enchase the reflectance. As a result, a large amount of light is reflected to the viewer, achieving bright display. Since the surfaces of the reflective patterns 312 are not exposed after the conductive layer 312' constituting the transparent electrodes is deposited, the reflective patterns 312 are prevented from corrosion and separation, thus improving the reliability.

Since the common electrodes 210 provided on the front substrate 200 are extracted to the back substrate 300 via the conductive particles 114 and the leads 350, and are further extracted to the region for mounting the driver IC chip 124 via the leads 360, the connection of the FPC board 150 is achieved on one side regardless of a passive matrix type in this embodiment. Thus, the mounting process is simplified.

Since each segment electrode 310 has a laminated configuration including the transparent conductive film 314 and the reflective pattern 312 which is composed of elemental silver or a silver alloy primarily containing silver, the resistance thereof is decreased. Similarly, the leads 350, 360, and 370 in the regions other than the display region have laminated configurations including the transparent conductive films 354, 364, and 374, respectively, and the reflective conductive films 352, 362, and 372, respectively, which are composed of the same conductive layer for the reflective patterns 312, the resistance thereof being decreased. Since the leads 360 from the FPC board 150 to the driver IC chip 122 include power supply lines of the driver IC chip 122 which supplies the common signals, a relatively high voltage is applied thereto, and the lead length is relatively large compared with the leads 370. When the leads 360 have high resistance, the effect of the voltage drop is significant. However, the laminated leads 360 in this embodiment have low resistance and the effect of the voltage drop is moderated.

In the region for mounting the driver IC chip 124, the segment electrodes 310 are provided with only the transparent conductive films 314 and thus not provided with the reflective patterns 312. In the region contained in the sealant 110 and the region for mounting the driver IC chip 122, the leads 350 are provided with only the transparent conductive films 354 and thus not provided with the reflective conductive films 352. In the region for mounting the driver IC chip 122 and the region for connecting the FPC board 150, the leads 360 are provided with only the transparent conductive film 364 and thus not provided with the reflective conductive film 362. In the region for mounting the driver IC 124 and the region for connecting the FPC board 150, the leads 370 are provided with only the transparent conductive film 374 and thus not provided with the reflective conductive film 372.

Since the silver alloy exhibits poor adhesiveness to other materials, it is not desirable that this alloy be provided at portions in which stress is applied. If a decrease in resistance of the leads has priority, it is preferable that the reflective pattern or the reflective conductive film be formed over the entire underlayer of the transparent electrode or the transparent conductive film. In such a configuration, however, insufficient connection of the driver IC chip in the mounting step may cause separation of the reflective conductive film from the substrate due to low adhesiveness, for example, when the driver IC is exchanged due to unsatisfactory connection. Thus, in this embodiment, only the transparent electrode or the transparent conductive film is deposited and a reflective conductive film of a silver alloy is not deposited in the region in which a stress is applied, thereby preventing separation of the reflective conductive film of a silver alloy or the like in advance.

Figure 8:
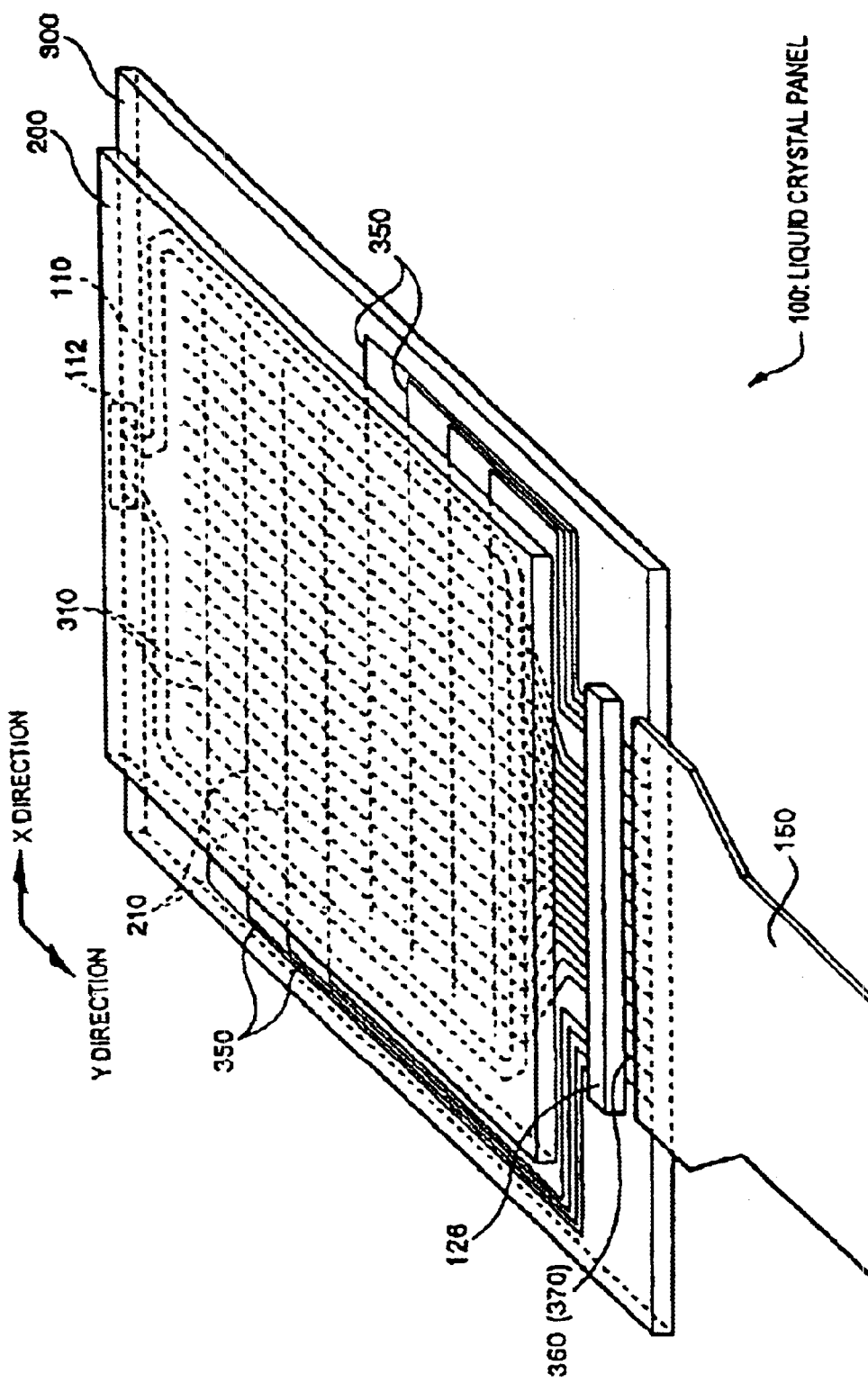
FIG. 8 is an isometric view illustrating a configuration of a liquid crystal panel according to a second embodiment of the present invention.

In the above embodiments, the common electrodes 210 are driven by the driver IC chip 122 and the segment electrodes 310 are driven by the driver IC chip 124. The present invention, however, is not limited to this configuration. For example, the present invention is applicable to a one-chip type including both ICs, as shown in FIG. 8.

The liquid crystal device shown in this drawing has a plurality of common electrodes 210 extending in the X direction on the front substrate 200 as in the above embodiment, but differs from the embodiment in that the upper half common electrodes 210 and the lower half common electrodes 210 are extracted from the left and the right, respectively, and are connected to a driver IC chip 126. The driver IC chip 126 includes both the driver IC chip 122 and the driver IC chip 124 in the above embodiment. Thus, the output side of the driver IC chip 126 is connected to the common electrodes 210, in addition to the segment electrodes 310, via the lead 350. Moreover, the FPC board 150 supplies signals for controlling the driver IC chip 126 from an external circuit (not shown in the drawing) via the leads 360 (370).

Figure 9:
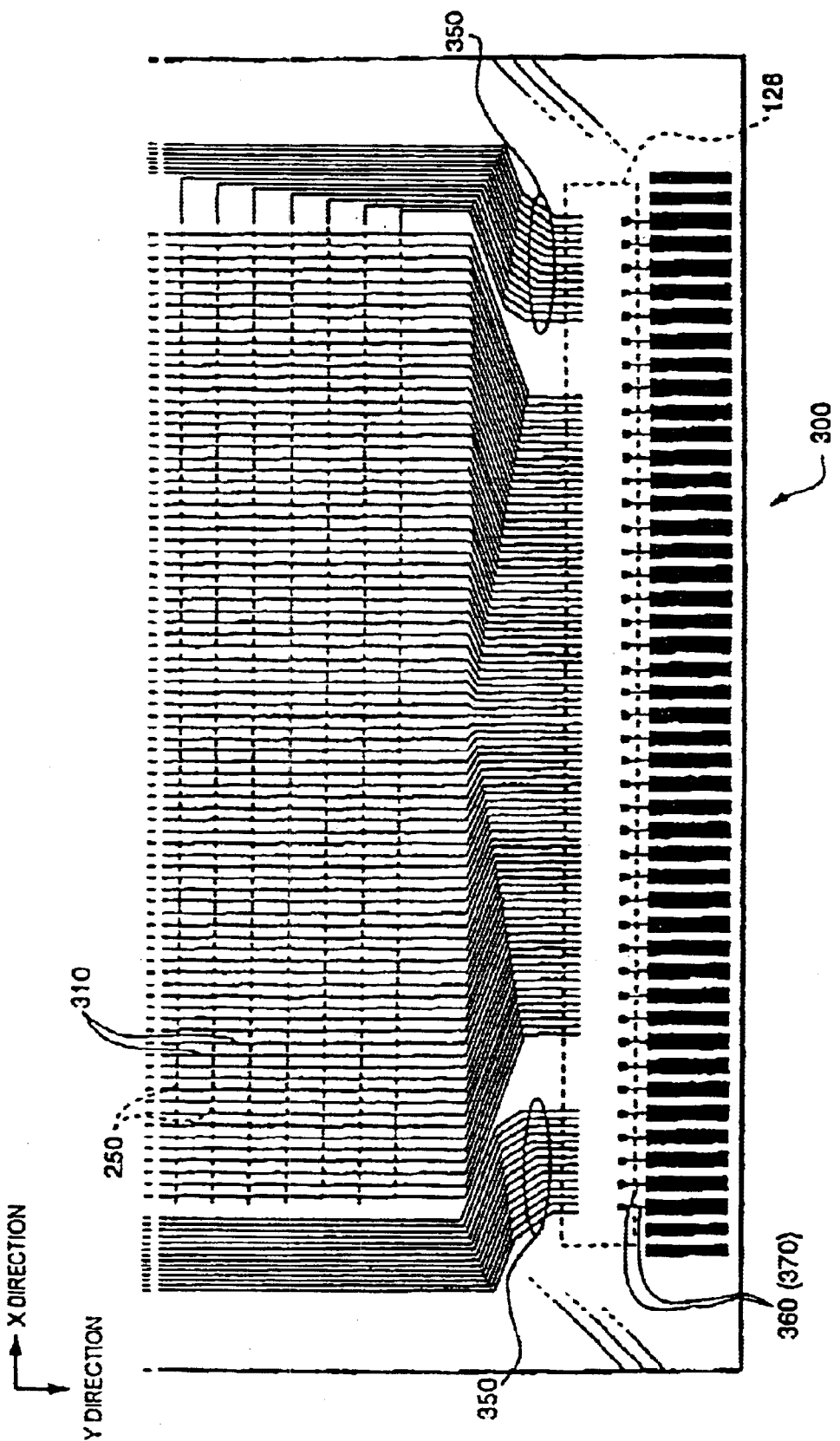
FIG. 9 is a plan view of a lead layout at the peripheries of a driver IC chip in the liquid crystal panel.

An actual lead layout in the vicinity of the region for mounting the driver IC chip 126 will now be described. FIG. 9 is a plan view of an embodiment of the lead layout. As shown in this drawing, the segment electrodes 310 extend with an increasing pitch from the output side of the driver IC chip 126 towards the display region, while the leads 350 and the common electrodes 210 extend with a decreasing pitch from the output side of the driver IC chip 126 in the Y direction, are bent by 90°, and extend towards the display region with an increased pitch.

The pitch of the leads 350 (common electrodes 210) is decreased in the region from the output side of the driver IC chip 126 in the Y direction, because this region is a dead space which does not contribute to display. If this region is wide, the yield of the substrate from a large mother glass is decreased, resulting in increased cost. Since a certain pitch is required for connection of the output bump of the driver IC chip 126 to the leads 350 by a COG technology, the pitch is increased in the region for connecting the driver IC chip 126.

When the number of the common electrodes 210 is small in the liquid crystal device shown in FIG. 8, the common electrodes 210 may be extracted from one side.

Figure 10:
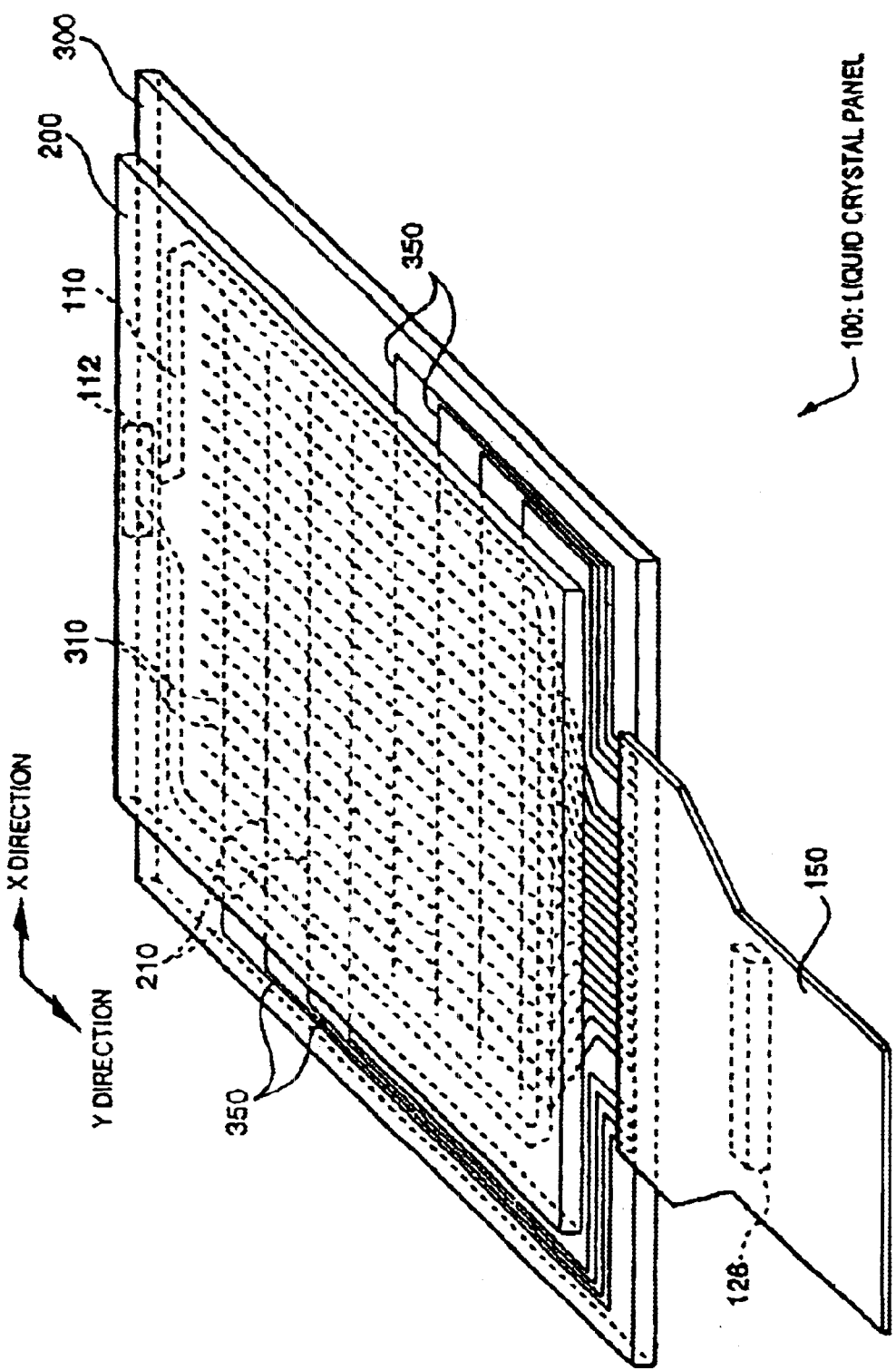
FIG. 10 is an isometric view of a configuration of a liquid crystal panel according to a modification of the second embodiment of the present invention.

As shown in FIG. 10, the present invention is also applicable to a type in which the driver IC chip 126 is not mounted on the liquid crystal panel 100. In the liquid crystal device shown in this drawing, the driver IC chip 126 is mounted on the FPC board 150 by, for example, a flip chip technology. Alternatively, the driver IC chip 126 may be bonded with inner leads by a tape automated bonding (TAB) technology and may be bonded to the liquid crystal panel 100 with outer leads. In such a configuration, however, the number of the connections to the FPC board 150 increases as the pixels increase.

In the first embodiment, the underlying film 303 is composed of an insulating material. The underlying film 303, however, may be composed of a conductive material such as ITO or $Sn_2O_3$. Thus, a third embodiment using a conductive material as the underlying film 303 will now be described. Since the liquid crystal device according to the third embodiment has the same appearance as that of the first embodiment shown in FIG. 1, the description is focused to configurations of internal electrodes and leads.

Figure 11:
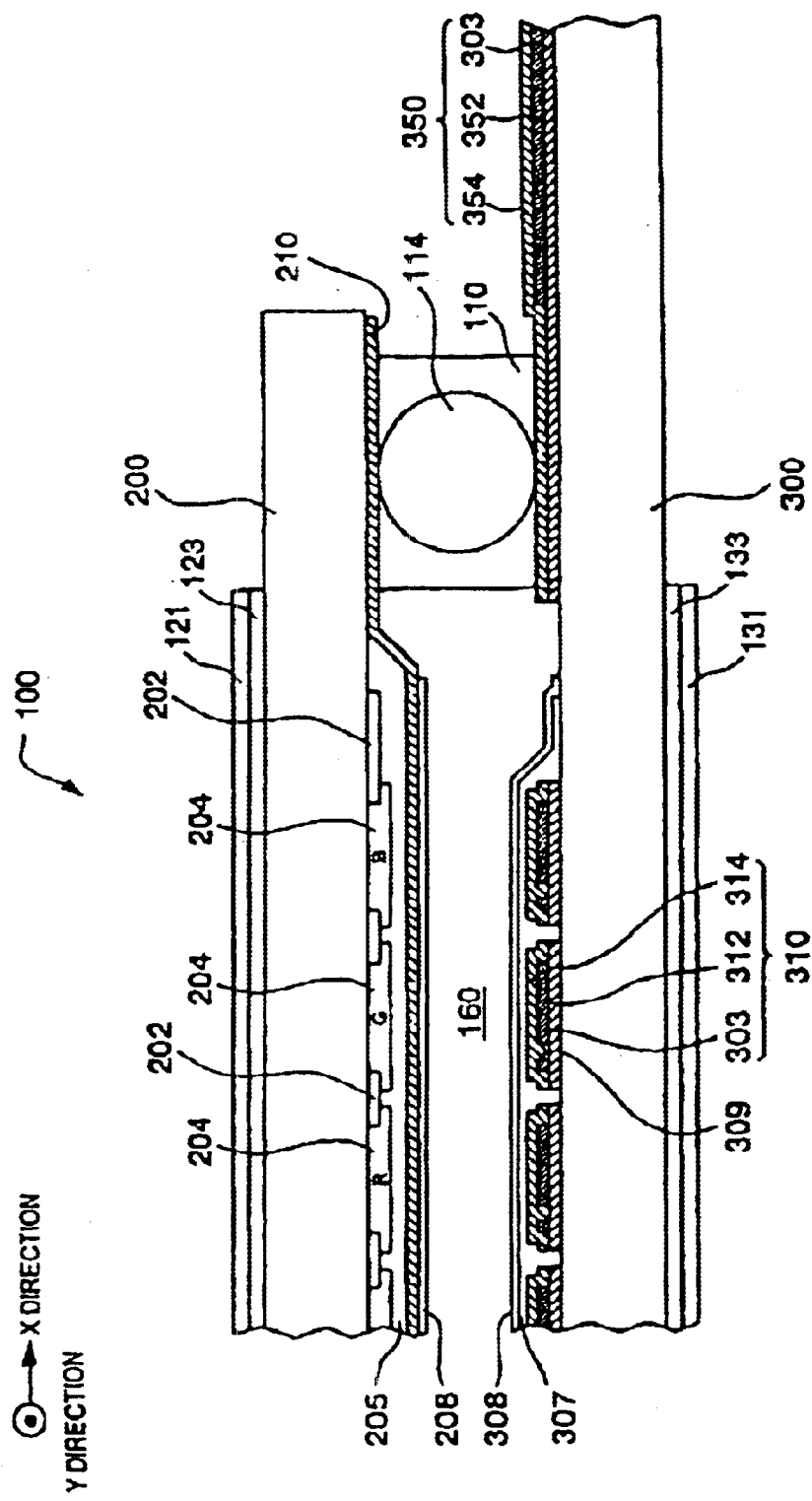
FIG. 11 is a partial cross-sectional view illustrating a configuration when a liquid crystal panel constituting a liquid crystal display device according to a third embodiment of the present invention is broken in the X direction.
Figure 12:
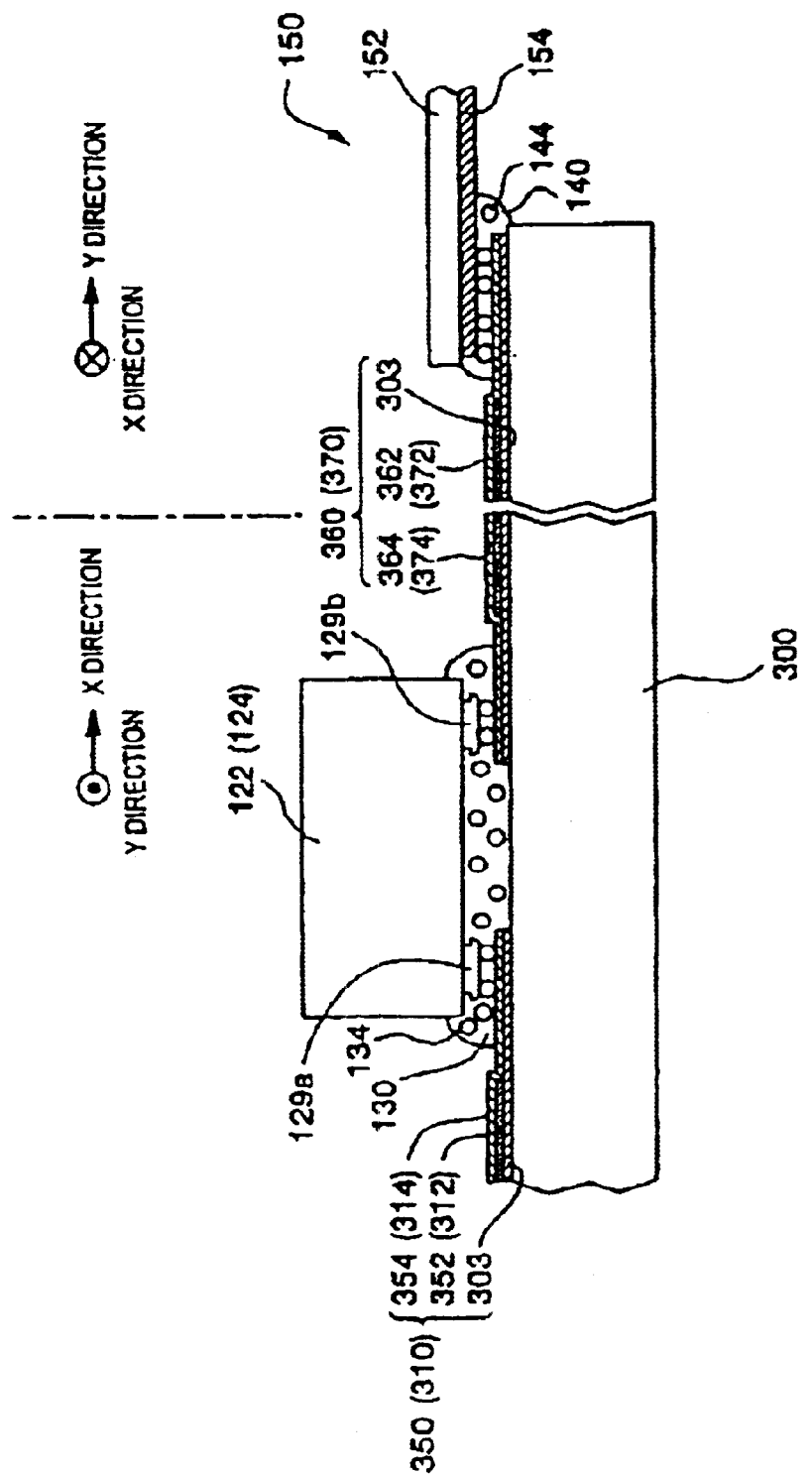
FIG. 12 is a partial cross-sectional view illustrating the vicinity of a region for mounting a driver IC chip in the liquid crystal panel.

FIG. 11 is a partial cross-sectional view of the liquid crystal panel of the liquid crystal device according to the third embodiment when the liquid crystal panel is broken along the X direction, and corresponds to FIG. 2 in the first embodiment. FIG. 12 is a cross-sectional view illustrating the configuration of a region for mounting the driver IC chip 122 (124) and a region for bonding the FPC board 150 on the back substrate 300, and corresponds to FIG. 4 in the first embodiment.

In these drawings, the underlying film 303 is provided in order to improve the adhesiveness of the reflective patterns 312 and the reflective conductive films 352, 362, 372, as in the first embodiment, but is composed of a conductive and light-transmissive material, such as ITO or $Sn_2O_3$, unlike the first embodiment.

The underlying film 303 is patterned by the same process for the transparent conductive films 314, 354, 364, and 373 so as to have substantially the same shapes as those of these transparent conductive films.

In detail, in the segment electrodes 310, the reflective patterns 312 are sandwiched by the underlying film 303 and the transparent conductive films 314, and the edge (peripheral) portions of the transparent conductive film 314 protruding from the reflective patterns 312 come into contact with the underlying film 303. Thus, the segment electrodes 310 have a triple-layer configuration including the conductive underlying film 303, the reflective patterns 312, and the transparent conductive films 314. The reflective patterns 312 are not formed, as shown by parentheses in FIG. 12, at the function to the output bump 129a of the driver IC chip 124.

In the leads 350 extending from the output bump 129a of the driver IC chip 122 to the connection with the common electrodes 210, as shown in FIGS. 11 and 12, the reflective conductive film 352 is sandwiched by the underlying film 303 and the transparent conductive film 354, and the edge portion of the transparent conductive film 354 protruding from the reflective conductive film 352 comes into contact with the underlying film 303. Thus, the lead 350 has a triple-layer configuration including the underlying film 303, reflective conductive film 352, and the transparent conductive film 354. The reflective conductive film 352 is not formed at the junctions with the common electrodes 210 via the conductive particles 114 (see FIG. 11) and at the junctions with the output bump of the driver IC chip 122 (see FIG. 12).

In the leads 360 extending from the terminal of the FPC board 150 to the input bump 129b of the driver IC chip 122, as shown in FIG. 12, the reflective conductive film 362 is sandwiched by the underlying film 303 and the transparent conductive film 364, and the edge portion of the transparent conductive film 364 protruding from the reflective conductive film 362 comes into contact with the underlying film 303. Thus, the lead 360 has a triple-layer configuration including the underlying film 303, the reflective conductive film 362, and the transparent conductive film 364. The reflective conductive film 362 is not formed at the junction with the FPC board 150 via the conductive particles 144 and the junction with the input bump 129b of the driver IC chip 122.

In the leads 370 extending from the terminal of the FPC board 150 to the input bump 129b of the driver IC chip 124, as shown by parentheses in FIG. 12, the reflective conductive film 372 is sandwiched by the underlying film 303 and the transparent conductive film 374, and the edge portion of the transparent conductive film 374 protruding from the reflective conductive film 372 comes into contact with the underlying film 303. Thus, the lead 370 has a triple-layer configuration including the underlying film 303, the reflective conductive film 372, and the transparent conductive film 374. The reflective conductive film 372 is not formed at the junction with the FPC board 150 via the conductive particles 144 and the junction with the input bump 129b of the driver IC chip 124.

In FIGS. 11 and 12, double-layer configurations including the underlying film 303 and the transparent conductive films 314, 354, 364, and 374 are employed in the connections with the driver IC chips and the FPC board 150. Alternatively, single-layer configurations including either layer may be employed.

The underlying film 303 in the third embodiment has the same shape as that of the transparent conductive film 314, 354, 364, or 374 in plan view. Thus the plan view illustrating sub-pixels of the liquid crystal panel according to third embodiment has the same as FIG. 3 which illustrates sub-pixels of the liquid crystal panel according to the first embodiment. Also, the partial plan view illustrating the vicinity of the region for mounting the driver IC chip in the liquid crystal panel according to the third embodiment is the same as FIG. 5 which illustrates the vicinity of the region for mounting the driver IC chip.

A manufacturing process of the liquid crystal device according to the third embodiment and particularly of the back substrate will be described. FIG. 13 illustrates the manufacturing steps and corresponds to FIG. 6 in the first embodiment.

Figure 13A:
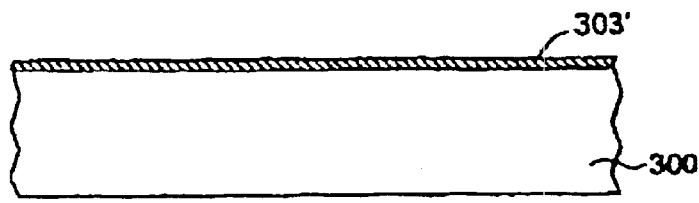
FIGS. 13(a) to (e) are cross-sectional views illustrating a manufacturing process of a back substrate in the liquid crystal panel.
Figure 13B:
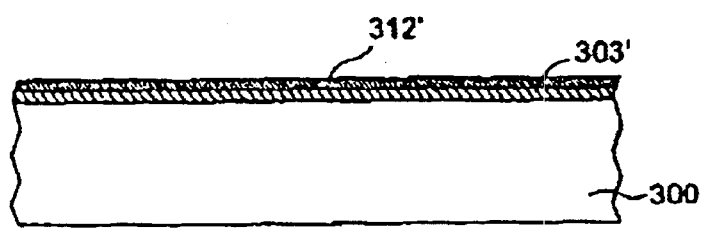

As shown in FIG. 13(a), a metal oxide material such as ITO or $Sn_2O_3$ is deposited on the entire inner face of the back substrate 300 by sputtering or the like to form an underlying layer 303'. As shown in FIG. 13(b), a reflective conductive layer 312' composed of elemental silver or primarily composed of silver is formed by sputtering or the like. The conductive layer 312' may be the same as that in the first embodiment.

Figure 13C:
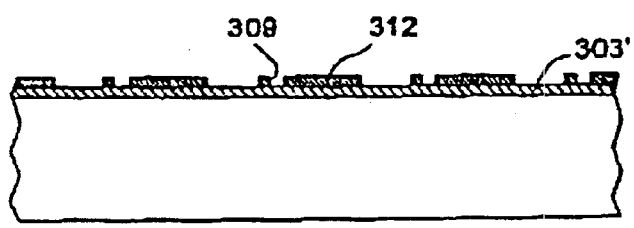

As shown in FIG. 13(c), the conductive layer 312' formed on the underlying layer 303' is patterned by photolithographic and etching processes. After the etching, the openings 309 and the reflective patterns 312 are formed in the display region, and the reflective conductive films 352, 362, and 372 are formed in regions other than the display region.

Since the underlying layer 303' of metal oxide and the conductive layer 312' of alloy have different selective ratios and since the conductive layer 312' is easily etched than the underlying layer 303', only the conductive layer 312' can be selectively etched using an appropriate etching solution. An exemplary etching solution is a mixture of phosphoric acid (54%), acetic acid (33%), nitric acid (0.6%), and the balance being water on a weight basis.

Figure 13D:
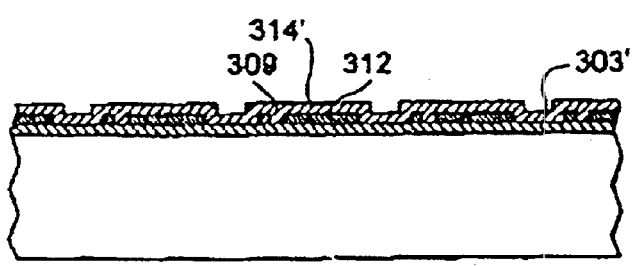
Figure 13E:
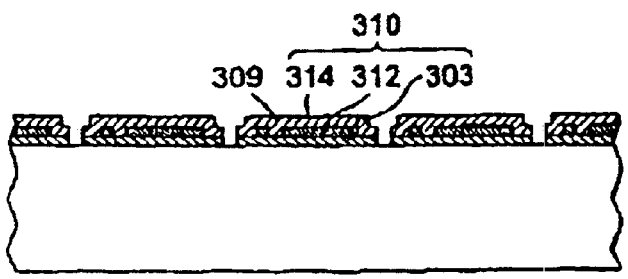

As shown in FIG. 13(d), the conductive layer 314' composed of ITO or the like is formed by sputtering or the like. As shown in FIG. 13(e), the underlying layer 303' and the conductive layer 314' are simultaneously patterned by photolithographic and etching processes to form the underlying films 303 and the transparent conductive films 314. The segment electrodes 310 are thereby formed. In regions other than the display region, the underlying layer 303' is patterned to form the underlying film 303, and the conductive layer 314' is patterned to form the transparent conductive films 354, 364, and 374. The leads 350, 360, and 370 are thereby formed.

When the transparent conductive films 314, 354, 364, and 374 (underlying film 303) are formed so as to be one size larger than the reflective patterns 312 and the reflective conductive films 352, 362, and 372, respectively, edge portions of the transparent electrode films protruding from the reflective patterns and the reflective conductive films come into contact with the underlying films 303. Thus, the reflective patterns and the reflective conductive films are not exposed.

The subsequent steps are the same as those in the first embodiment. That is, the protective film 307 and the alignment film 308 shown in FIG. 11 are formed in that order, and the alignment film 308 is subjected to rubbing treatment. The resulting back substrate 300 and a front substrate 200 having a rubbing-treated alignment film 208 are bonded to each other with a sealant 110 containing dispersed conductive particles 114. A liquid crystal 160 is dropwise supplied to the opening of the sealant 110 under vacuum. After the pressure is backed to normal pressure so that the liquid crystal 160 spreads over the entire panel, the opening is sealed with a sealant 112. The driver IC chips 122 and 124 and the FPC board 150 are mounted to complete the liquid crystal panel 100 shown in FIG. 1.

According to the third embodiment, the reflective patterns 312 of a silver alloy and the reflective conductive films 352, 362, and 372 are completely covered by the transparent conductive films 314, 354, 364, and 374, respectively, and are sandwiched by the underlying layers and the transparent conductive films which are metal oxides. Thus, the adhesiveness between the underlying films and the transparent conductive films is superior to the first embodiment using the inorganic material and metal oxide, preventing penetration of moisture etc., from the interface therebetween.

In the third embodiment, the underlying film 303 is provided as a metal oxide film. The patterning step thereof is the same as that of the transparent conductive films 314, 354, 364, and 374. Thus, the process is not complicated compared to the first embodiment.

In the third embodiment, the triple-layer configuration is employed in regions other than the junctions. Thus, lead resistance is reduced compared to the first embodiment employing the double-layer configuration. Other effects are the same as those in the first embodiment.

In the first to third embodiments, a passive matrix type is described. However, the present invention can be applied to active matrix types which drive liquid crystal using active (switching) elements. A fourth embodiment for driving liquid crystal using active devices will now be described. Thin film diodes (TFDs) are used as the active devices in the fourth embodiment. Since the liquid crystal device in accordance with the fourth embodiment has the same appearance as that in FIG. 1 in the first embodiment, the description is focused to the configuration of internal electrodes and leads.

Figure 14A:
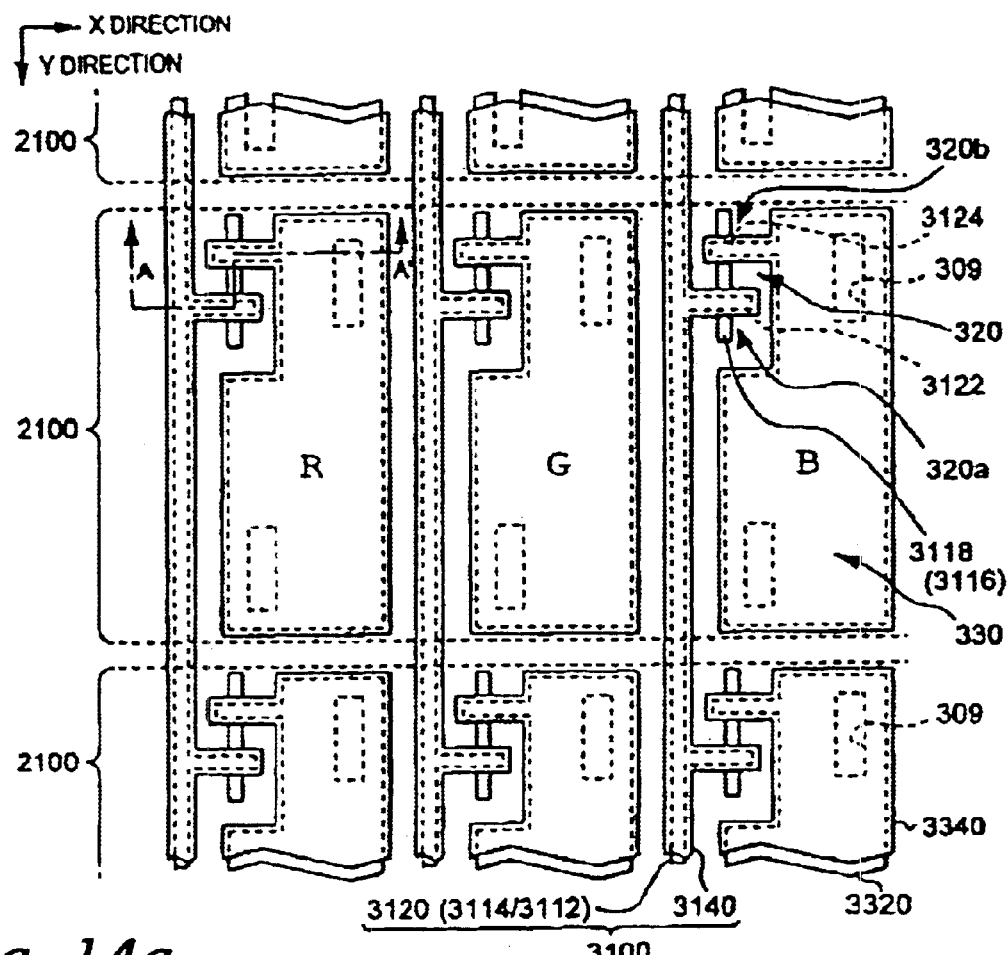
FIG. 14(a) is a plan view illustrating a pixel configuration of a liquid crystal panel constituting a liquid crystal display device according to a fourth embodiment of the present invention.
Figure 14B:
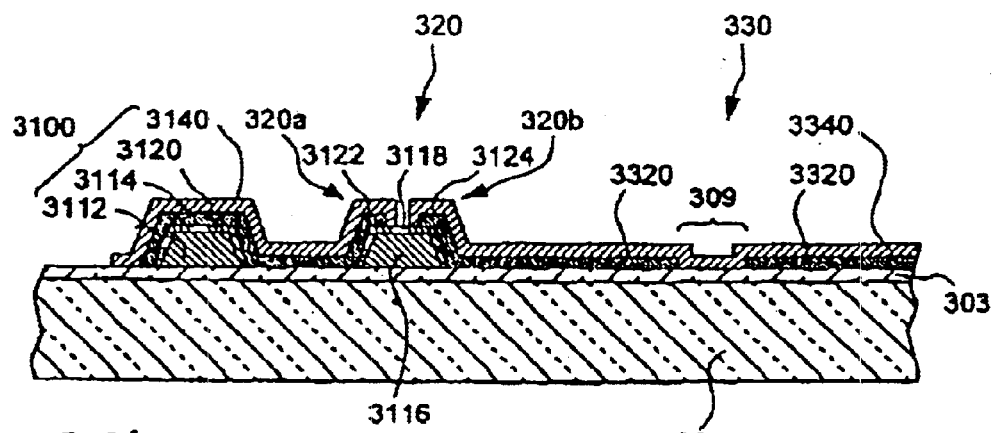
FIG. 14(b) is a cross-sectional view taken from line A–A' in FIG. 14(a).

FIG. 14(a) is a plan view illustrating a layout of one pixel in the liquid crystal panel 100 according to the fourth embodiment, and FIG. 14(b) is a cross-sectional view taken along line A–A' in FIG. 14(a).

As shown in these drawings, in the liquid crystal panel 100, scanning lines 2100 extend in the line (X) direction on the front substrate and data lines (signal lines) 3100 extend in the row (Y) direction on the back substrate. Rectangular pixel electrodes 330 are arranged into a matrix at crossings between the scanning lines 2100 and the data lines 3100. Pixel electrodes 330 arrayed in the same row are commonly connected to one data line 3100 via TFDs 320.

In this embodiment, the scanning lines 2100 are driven by the driver IC chip 122 and the data lines 3100 are driven by the driver IC chip 124.

In this embodiment, the TFD 320 consists of a first TFD 320a and a second TFD 320b and includes a first metal film 3116 of tantalum-tungsten, an insulating film 3118 formed by anodic oxidation of the surface of the first metal film 3116, and second metal films 3112 and 3124 formed and mutually separated on the insulating film 3118, these films are formed on an insulating light-transmissive underlying film 303 provided on the inner face of the back substrate 300. The second metal films 3122 and 3124 are reflective conductive films of a silver alloy or the like. The second metal film 3122 functions as part of a data line 3100, while the other second metal film 3124 functions as a reflective conductive film 3322 of a pixel electrode 330 having an opening 309.

The first TFD 320a of the TFD 320 has a metal/insulator/metal (MIM) structure of second metal layer 3122/insulating film 3118/first metal film 3116 from the data line 3100 side; hence, the current-voltage relationship is nonlinear for both positive and negative voltages.

In contrast, the second TFD 320b has a structure of first metal film 3116/insulating film 3118/second metal film 3124 from the data line 3100 side. Thus, this has a current-voltage relationship which is opposite to that of the first TFD 320*a*. Thus, in the TFD 320, two diodes are connected in series in the opposite directions, and the nonlinear current-voltage relationship is more symmetrical to the positive and negative voltages compared with the use of one diode.

A reflective conductive film 3120 being part of the data line 3100, the second metal films 3122 and 3124, and a reflective conductive film 3320 of the pixel electrode 330 are formed by patterning the same silver alloy layer. Thus, in this embodiment, these films are covered by transparent conductive films 3140 and 3340 composed of ITO so that these films are not exposed. The data line 3100 consists of the metal film 3112, the insulating film 3114, the reflective conductive film 3120, and the transparent conductive film 3140, from the underlying film 303 side.

The pixel electrodes 330 face the scanning lines 2100 in the same line. The scanning lines 2100 are strip transparent electrodes composed of ITO, as in the common electrodes 210 in the first, second, and third embodiments. Thus, the scanning lines 2100 function as the counter electrodes of the pixel electrodes 330.

Thus, the liquid crystal capacitance of the sub-pixel corresponding a certain color is constituted by the liquid crystal 160 which is disposed between the corresponding scanning line 2100 and the corresponding pixel electrode 330 at the crossing between the scanning line 2100 and the corresponding data line 3100.

When a selection voltage which is sufficient to switch on TFDs 320 is applied to a scanning line 2100 in such a configuration, the TFD 320 which corresponds to the crossing between the scanning line 2100 and the corresponding data line 3100 is switched on, regardless of the data voltage which is applied to the data line. A charge corresponding to the difference between the selection voltage and the data voltage is accumulated into the liquid crystal capacitor connected to the switched-on TFD 320. This accumulated charge is maintained, if a nonselection voltage is applied to the scanning line 2100 after the accumulation of the charge.

Since the alignment state of the liquid crystal 160 varies with the amount of the charge accumulated in the liquid crystal capacitor, the amount of light passing through the polarizer 121 (see FIGS. 2 and 11) also varies in response to the amount of accumulated charge in both transmissive and reflective types. Thus, the data voltage when the selection voltage is applied controls the amount of charge accumulated in the liquid crystal capacitor in each sub-pixel, so that a predetermined gray-scale display is achieved.

A manufacturing process of the liquid crystal device according to the fourth embodiment and particularly of the back substrate will now be described. FIGS. 15, 16, and 17 show the production steps.

As shown in FIG. 15(*a*), $Ta_2O_5$, $SiO_2$, or the like is deposited on the entire inner face of a back substrate 300 by sputtering or a tantalum film deposited by a sputtering process is thermally oxidized to form an underlying film 303.

As shown in FIG. 15(*b*), a first metal layer 3112' is deposited on the underlying film 303. The thickness of the first metal layer 3112' is appropriately determined depending on the use of the TFD 320 and is generally in the range of 100 to 500 nm. The first metal layer 3112' is composed of, for example, elemental tantalum or a tantalum alloy such as tantalum-tungsten (TaW).

When elemental tantalum is used as the first metal layer 3112', this can be formed by a sputtering process or an electron beam deposition process. When the tantalum alloy is used as the first metal layer 3112', the alloy contains Groups 6 to 8 elements in periodic table, such as chromium, molybdenum, rhenium, yttrium, lanthanum, and dysprosium, in addition to tantalum as the major component.

Tungsten is preferred as an auxiliary component, as described above, and the content thereof is preferably in the range of 0.1 to 6 percent by weight. The first metal layer 3112' composed of the tantalum alloy is formed by a sputtering process using an alloyed target, a co-sputtering process, an electron-beam deposition process, or the like.

Then, as shown in FIG. 15(*c*), the first metal layer 3112' is patterned by photolithographic and etching processes to form metal films 3112 which are the bottommost layers of the data lines 3100 and first metal films 3116 which branched from the metal films 3112.

As shown in FIG. 15(*d*), the surfaces of the first metal films 3116 are anodized to form oxidized insulating films 3118. In this step, the surfaces of the metal films 3112 which are the bottommost layers of the data lines 3100 are simultaneously oxidized to form insulating films 3114. The thickness of the insulating films 3118 is appropriately determined and is in the range of, for example, 10 to 35 nm in this embodiment.

Since the TFD 320 is composed of the first TFD 320*a* and the second TFD 320*b* in this embodiment, the thickness of the insulating film 3118 is approximately half the thickness thereof when only one TFD is used in one sub-pixel. The anodic solution used in the anodic oxidation is not limited. An exemplary solution is an aqueous 0.01 to 0.1 weight percent citric acid solution.

As shown in FIG. 15(*e*), the broken line portion 3119 of each insulating film 3118 which is branched from the base of the data line 3100 (the metal film 3112 covered by the insulating film 3114) and the underlying first metal film 3116 are removed. Thereby, the first metal film 3116 which is commonly used by the first TFD 320*a* and the second TFD 320*b* is electrically isolated from the data line 3100. The broken line portion 3119 is removed by general photolithographic and etching processes.

As shown in FIG. 16(*f*), a reflective conductive layer 3120' which is composed of elemental silver or primarily composed of silver is formed by sputtering or the like. This conductive layer 3120' may be composed of the same material as that for the conductive layer 312' in the first embodiment.

As shown in FIG. 16(*g*), the conductive layer 3120' is patterned by a photolithographic process and an etching process to form the reflective conductive films 3120 of the data lines 3100 and the second metal films 3122 and 3124 of the TFDs 320, and the reflective conductive films 3320 of the pixel electrodes 330.

In each reflective conductive film 3320, an opening 309 used in a transmissive type is simultaneously provided. The second metal film 3122 corresponds to the branch from the reflective conductive film 3120, and the second metal film 3124 corresponds to the protrusion from the reflective conductive film 3320.

During the patterning step of the conductive layer 3120', reflective conductive films 352, 362, and 372 (see FIG. 4) in leads are simultaneously formed. The reflective conductive film 3120 in this embodiment corresponds to the reflective pattern 312 in the first embodiment.

These reflective conductive films are not formed at connections with the driver IC chip and the FPC board, as in the first embodiment.

As shown in FIG. 17(h), a transparent conductive layer 3140' of ITO or the like is formed by sputtering etc. As shown in 17(i), the conductive layer 3140' is patterned by a photolithographic process and an etching process to form the transparent conductive films 3140 which completely cover the reflective conductive films 3120 of a silver alloy and the second metal films 3122. Similarly, the transparent conductive films 3340 are formed so as to completely cover the reflective conductive films 3320 and the second metal films 3124.

During the patterning step of the conductive layer 3140', each of the transparent conductive films 354, 364, and 374 in leads is formed so as to completely cover the respective reflective conductive films 352, 362, and 372.

The subsequent steps are the same as those in the first embodiment. The protective film 307 and the alignment film 308 shown in FIG. 2 are formed in that order, and the alignment film 308 is subjected to rubbing treatment. The resulting back substrate 300 and a front substrate 200 having a rubbing-treated alignment film 208 are bonded to each other with a sealant 110 containing dispersed conductive particles 114. A liquid crystal 160 is dropwise supplied to the opening of the sealant 110 under vacuum. After the pressure is backed to normal pressure so that the liquid crystal 160 spreads over the entire panel, the opening is sealed with a sealant 112. The driver IC chips 122 and 124 and the FPC board 150 are mounted to complete the liquid crystal panel 100 shown in FIG. 1.

In the fourth embodiment, the second metal films 3122 and 3124 of the TFD 320, and the reflective conductive film 3120 of the data line 3100 are composed of the same layer for the reflective conductive film 3320. Thus, the manufacturing process is not so significantly complicated. Since the data line 3100 includes the reflective conductive film 3120 with low resistance, the wiring resistance thereof is reduced.

According to the fourth embodiment, the second metal films 3122 and 3124 and the reflective conductive films 3120 and 3320 are composed of a silver alloy. Since these are completely covered by the transparent conductive films 3140 and 3340 such as ITO, as in the reflective conductive films 352, 362, and 372 for the leads 350, 360, and 370, respectively, these are prevented from corrosion and separation, improving the reliability.

In the TFD 320 in the fourth embodiment, the first TFD 320a and the second TFD 320b are arranged in the opposite directions to obtain a symmetric current-vs.-voltage relationship to the positive and negative voltages. If such a symmetric current-vs.-voltage relationship is not required, only one TFD may be employed.

The TFD 320 in the fourth embodiment is an example of diode switching elements. Thus, the active device may be a single element using a zinc oxide (ZnO) varistor or metal semi-insulator (MSI), or a diode switching element using the same two elements which are connected in series or parallel in opposite directions. Instead of these diode elements, a thin film transistor for driving may be provided. The same conductive layer as that for the reflective pattern may be used as a part or all of the leads to these elements.

In the above embodiments, transflective liquid crystal devices are described. However, the present invention is also applicable to a reflective liquid crystal device not having openings 309. In the reflective type, a front light which emits light from the viewer side may be provided instead of the backlight, if necessary.

In the transflective type, the reflective pattern 312 (reflective conductive film 3320) is not necessarily provided with the openings 309, as long as the light incident from the back substrate 300 is partially visible by the viewer through the liquid crystal 160. For example, when the thickness of the reflective pattern 312 is extremely small, the device can function as a transflective pattern even if the openings 309 are not provided.

In the above embodiments, connection between the common electrodes 210 and the leads 350 is achieved with conductive particles 114 contained in the sealant 110. However, the connection may be achieved in another region provided at the exterior of the frame of the sealant 110.

Since the common electrodes 210 (scanning lines 2100) and the segment electrodes 310 (data lines 3100) are complementary to each other, the segment electrodes (data lines) and the common electrodes (scanning lines) may be provided on the front substrate 200 and the back substrate 300, respectively.

Although the above embodiments describe liquid crystal devices which perform color displaying, the present invention is also applicable to liquid crystal devices which perform monochromatic displaying.

Although a TN liquid crystal is used in the above embodiments, the liquid crystal device may be a bistable type having a memory effect such as a bistable twisted nematic (BTN) type and a ferroelectric type, a polymer dispersion type, or a guest-host type in which a dye (guest) having different visible light absorbencies between the long axis and the short axis of molecules is dissolved in a liquid crystal (host) having a predetermined molecular arrangement so that the dye molecules and the liquid crystal molecules are arranged in parallel.

Moreover, the configuration may be a vertical (homeotropic) alignment in which the liquid crystal molecules are arranged perpendicular to the both substrates when no voltage is applied and parallel to the both substrates when a voltage is applied, or may be a parallel (homogeneous) alignment in which the liquid crystal molecules are arranged parallel to the both substrates when no voltage is applied and perpendicular to the both substrates when a voltage is applied. Accordingly, the present invention can be applied to various types of liquid crystals and alignment systems.

Several electronic apparatuses using the above liquid crystal device will now be described.

Figure 18:
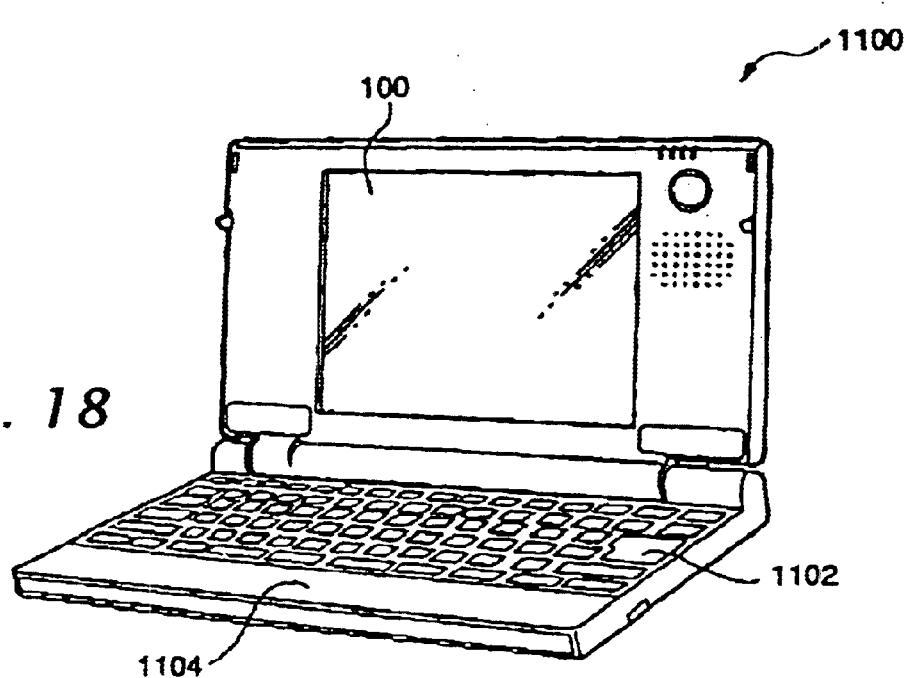
FIG. 18 is an isometric view of a personal computer as an example of the electronic apparatuses using the liquid crystal panel in accordance with the embodiments.

An example in which the liquid crystal panel according to one of the above embodiments is applied to a mobile personal computer will now be described. FIG. 18 is an isometric view illustrating the configuration of this personal computer. In the drawing, the personal computer 1100 is provided with a body 1104 including a keyboard 1102 and a liquid crystal display unit. The liquid crystal display unit 1106 is provided with a backlight (not shown in the drawing) at the back face of the above-described liquid crystal panel 100. The display is thereby visible as a reflective type when external light is sufficient or a transmissive type when external light is insufficient.

Figure 19:
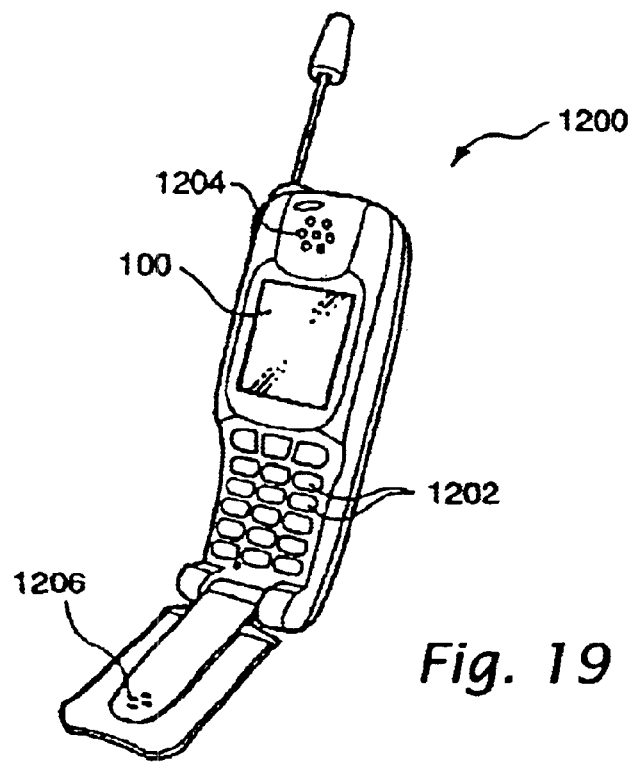
FIG. 19 is an isometric view of a portable phone as an example of the electronic apparatuses using the liquid crystal panel.

Next, an example in which the liquid crystal device is applied to a display section of a portable phone will now be described. FIG. 19 is an isometric view illustrating the configuration of the portable phone. In the drawing, the portable phone 1200 is provided with a plurality of operation keys 1202, an earpiece 1204, a mouthpiece 1206, and the above-mentioned liquid crystal panel 100. This liquid crystal panel 100 may be provided with a backlight (not shown in the drawing) at the back face thereof for improving the visibility.

Figure 20:
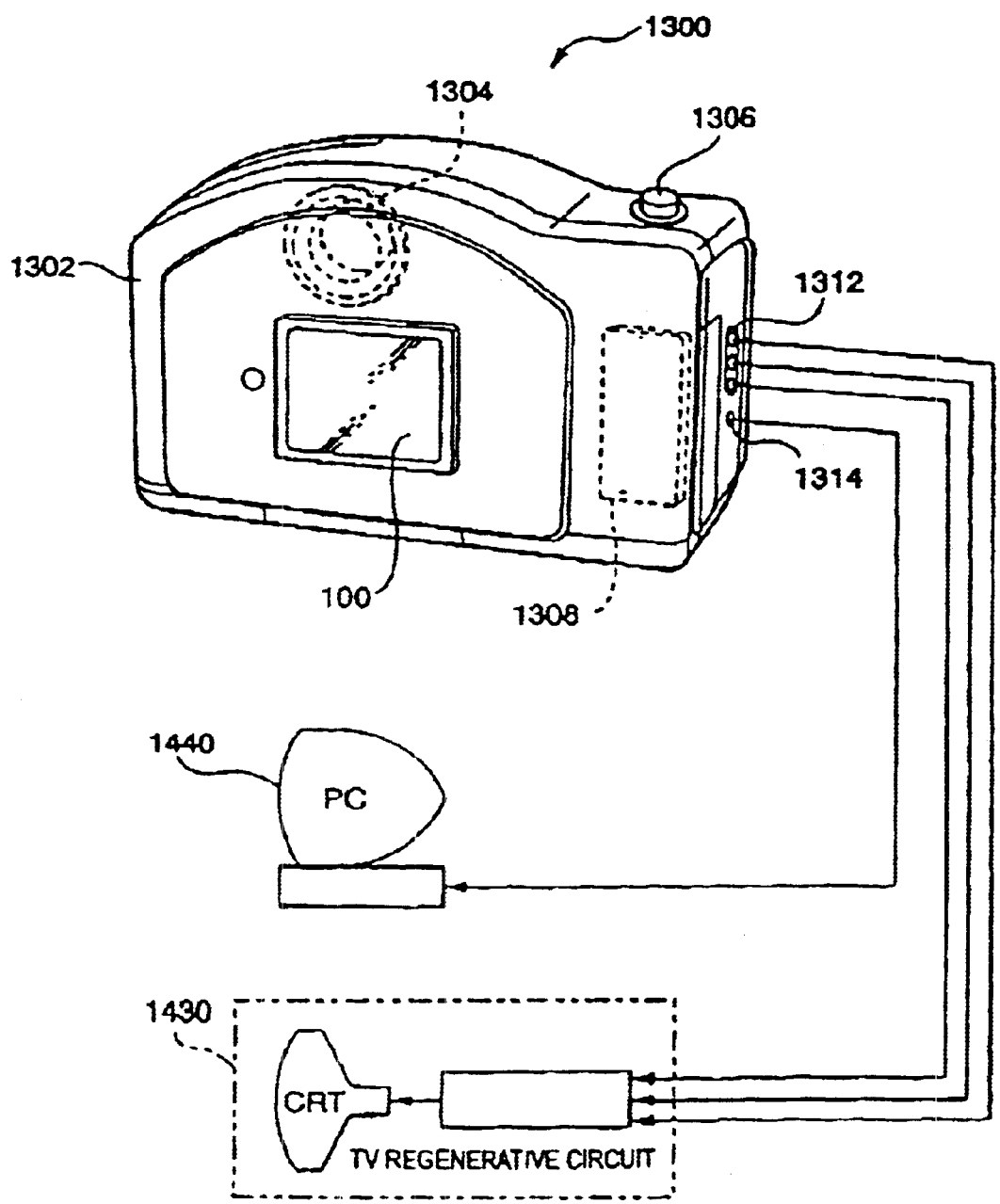
FIG. 20 is an isometric view at the back side of a digital still camera as an example of the electronic apparatuses using the liquid crystal panel.

Next, a digital still camera using the liquid crystal device as a finder will be described. FIG. 20 is an isometric view illustrating the configuration of the digital still camera and the connection to external devices in brief.

Typical cameras sensitize films based on optical images from objects, whereas the digital still camera 1300 generates imaging signals from the optical image of an object by photoelectric conversion using, for example, a charge coupled device (CCD). The digital still camera 1300 is provided with the liquid crystal panel 100 at the back face of a case 1302 to perform display based on the imaging signals from the CCD. Thus, the liquid crystal panel 100 functions as a liquid crystal finder for displaying the object. A photo acceptance unit 1304 including optical lenses and the CCD is provided at the front side (behind in the drawing) of the case 1302.

When a cameraman determines the object image displayed in the liquid crystal panel 100 and releases the shutter, the image signals from the CCD are transmitted and stored to memories in a circuit board 1308. In the digital still camera 1300, video signal output terminals 1312 and input/output terminals 1314 for data communication are provided on a side of the case 1302. As shown in the drawing, a television monitor 1430 and a personal computer 1440 are connected to the video signal terminals 1312 and the input/output terminals 1314, respectively, if necessary. The imaging signals stored in the memories of the circuit board 1308 are output to the television monitor 1430 and the personal computer 1440, by a given operation.

Examples of electronic apparatuses, other than the personal computer shown in FIG. 18, the portable phone shown in FIG. 19, and the digital still camera shown in FIG. 20, include liquid crystal television sets, view-finder-type and monitoring-type video tape recorders, car navigation systems, pagers, electronic notebooks, portable calculators, word processors, workstations, TV telephones, point-of-sales system (POS) terminals, and devices provided with touch panels. Of course, the above liquid crystal device can be applied to display sections of these electronic apparatuses.

As described above, according to the present invention, high reliability is achieved when a silver alloy is used as a reflective film and a lead.

What is claimed is:

1. A liquid crystal device including a first substrate and a second substrate opposing each other and a liquid crystal enclosed in a gap between the first substrate and the second substrate, the liquid crystal device comprising:
   an underlying film provided on the first substrate;
   a reflective conductive film which is formed on the underlying film and which contains silver; and
   a metal oxide film which is deposited on the reflective conductive film and which is patterned so that the edge portion of the metal oxide film comes into contact with the underlying film.

2. The liquid crystal device according to claim 1, wherein the underlying film comprises a metal oxide.

3. The liquid crystal device according to claim 1, wherein a reflective layer reflecting blue light is provided on the upper face of the reflective conductive film.

4. An electronic apparatus comprising a liquid crystal device according to claim 1.

5. A liquid crystal device including a first substrate and a second substrate opposing each other and a liquid crystal enclosed in a gap between the first substrate and the second substrate, the liquid crystal device comprising:
   a first lead provided on the first substrate;
   a conductive film provided on the second substrate; and
   a conductive material connecting the first lead and the conductive film;
   wherein the first lead comprises an underlying film, a metal film which is formed on the underlying film and which contains silver, and a metal oxide film which is deposited on the metal film and which is patterned so that the edge portion of the metal oxide film comes into contact with the underlying film.

6. The liquid crystal device according to claim 5, wherein the underlying film comprises a metal oxide.

7. The liquid crystal device according to claim 5, wherein the metal film is formed at a portion other than the connection to the conductive material.

8. The liquid crystal device according to claim 5, further comprising:
   a pixel electrode provided on the first substrate;
   an active element connected to the pixel electrode at one end of the active element;
   a signal line provided on the first substrate and connected to the first lead to apply a voltage to the liquid crystal; and
   wherein the signal line is connected to the other end of the active element.

9. The liquid crystal device according to claim 5,
   further comprising a driver IC chip for driving the liquid crystal;
   wherein the driver IC chip comprises an output bump for supplying an output signal to the first lead, and
   the output bump is connected to the first lead.

10. The liquid crystal device according to claim 9,
   wherein the metal film is formed at a portion other than the connection to the output bump.

11. The liquid crystal device according to claim 5, further comprising:
   a second lead provided on the first substrate and a driver IC chip for driving the liquid crystal,
   wherein the driver IC chip comprises an input bump for inputting an input signal from the second lead,
   the input bump is connected to the second lead, and
   the second lead comprises an underlying film, a metal film which is formed on the underlying film and which contains silver, and a metal oxide film which is deposited on the metal film and which is patterned so that the edge portion of the metal oxide film comes into contact with the underlying film.

12. The liquid crystal device according to claim 11,
   wherein the metal film is formed at a portion other than the connection to the input bump.

13. The liquid crystal device according to claim 11, further comprising:
   an external circuit board for supplying an input signal to the driver IC chip,
   wherein the external circuit board and the second lead are connected to each other, and
   the metal film is formed at a portion other than the connection to the external circuit board.

14. The liquid crystal device according to claim 5, further comprising:
   a second lead provided on the first substrate and a driver IC chip for driving the liquid crystal,
   wherein the driver IC chip comprises an input bump for inputting an input signal from the second lead, the input bump is connected to the second lead, and the second lead comprises an underlying film, a metal film which is formed on the underlying film and which contains silver, and a metal oxide film which is deposited on the reflective conductive film and which is patterned so that the metal oxide film protruding from an edge of the reflective film comes into contact with the underlying film.

15. A liquid crystal device including a first substrate and a second substrate opposing each other and a liquid crystal enclosed in a gap between the first substrate and the second substrate, the liquid crystal device comprising:

an electrode provided on the first substrate for supplying a voltage to the liquid crystal;

a first lead connected to the electrode; and a driver IC chip connected to the first lead, wherein the first lead comprises an underlying film, a metal film which is formed on the underlying film and which contains silver, and a metal oxide film which is deposited on the metal film and which is patterned so that the edge portion of the metal oxide film comes into contact with the underlying film.

16. The liquid crystal device according to claim 15, wherein the metal film is formed at a portion other than the connection to the driver IC chip.

17. The liquid crystal device according to claim 15, further comprising:

a second lead provided on the first substrate, wherein the driver IC chip comprises an input bump for inputting an input signal from the second lead, the input bump is connected to the second lead, and the second lead comprises an underlying film, a metal film which is formed on the underlying film and which contains silver, and a metal oxide film which is deposited on the metal film and which is patterned so that the edge portion of the metal oxide film comes into contact with the underlying film.

18. The liquid crystal device according to claim 17, further comprising:

an external circuit board for supplying an input signal to the second lead, wherein the metal film is formed at a portion other than the connection to the external circuit board.

19. The liquid crystal device according to claim 15, further comprising:

a second lead provided on the first substrate, wherein the driver IC chip comprises an input bump for inputting an input signal from the second lead, the input bump is connected to the second lead, and the second lead comprises an underlying film, a metal film which is formed on the underlying film and which contains silver, and a metal oxide film which is deposited on the reflective conductive film and which is patterned so that the metal oxide film protruding from an edge of the reflective film comes into contact with the underlying film.

20. A liquid crystal device including a first substrate and a second substrate opposing each other and a liquid crystal enclosed in a gap between the first substrate and the second substrate, the liquid crystal device comprising:

a lead provided on the first substrate, wherein the lead comprises an underlying film, a metal film formed on the underlying film, and a metal oxide film deposited on the metal film;

a first extending region which is provided at one side of the first substrate and which does not overlap the second substrate; and a second extending region which is provided at a side crossing said one side of the first substrate and which does not overlap the second substrate, wherein the lead is provided over the first extending region and the second extending region.

21. The liquid crystal device according to claim 20, wherein the underlying film comprises a metal oxide.

22. The liquid crystal device according to claim 20, wherein the metal film comprises elemental silver or a silver alloy.

23. A liquid crystal device including a first substrate and a second substrate opposing each other and a liquid crystal enclosed in a gap between the first substrate and the second substrate, the liquid crystal device comprising:

an underlying film provided on the first substrate;

a reflective conductive film which is formed on the underlying film and which contains silver;

a first transparent electrode deposited on the reflective conductive film and comprising a metal oxide film which is patterned so that the edge portion of the first transparent electrode comes into contact with the underlying film;

a second transparent electrode provided on the second substrate; and a transflective portion provided corresponding to the crossing between the first transparent electrode and the second transparent electrode.

24. A liquid crystal device including a first substrate and a second substrate opposing each other and a liquid crystal enclosed in a gap between the first substrate and the second substrate, the liquid crystal device comprising:

an underlying film provided on the first substrate;

a reflective conductive film which is formed on the underlying film and which contains silver;

a first transparent electrode deposited on the reflective conductive film and comprising a metal oxide film which is patterned so that the edge portion of the reflective conductive film comes into contact with the underlying film;

a second transparent electrode provided on the second substrate; and a color layer provided corresponding to a crossing between the first transparent electrode and the second transparent electrode.

25. A method for making a liquid crystal device including a first substrate and a second substrate opposing each other and a liquid crystal enclosed in a gap between the first substrate and the second substrate, the method comprising the steps of:

forming an underlying film on the first substrate;

forming a reflective conductive film containing silver on the underlying film; and forming a metal oxide film on the reflective conductive film so that the edge portion of the reflective conductive film comes into contact with the underlying film.

26. The method for making a liquid crystal device according to claim 25, wherein the underlying film comprises a metal oxide.

27. The method for making a liquid crystal device according to claim 25, further comprising the step of:

simultaneously patterning the underlying film and the metal oxide film.

28. A liquid crystal device comprising a first substrate and a second substrate opposing each other and a liquid crystal enclosed in a gap between the first substrate and the second substrate, the liquid crystal device further comprising:

a pixel electrode provided on the first substrate;

an active element connected to the pixel electrode;

a signal line provided on the first substrate and connected to the first lead to apply a voltage to the liquid crystal;

wherein the pixel electrode comprises an underlying film, a metal film which is formed on the underlying film and which contains silver, and a metal oxide film which is deposited on the metal film and which is patterned so that the edge portion of the metal oxide film comes into contact with the underlying film.

29. A liquid crystal device including a first substrate and a second substrate opposing each other and a liquid crystal enclosed in a gap between the first substrate and the second substrate, the liquid crystal device comprising:

an underlying film provided on the first substrate;

a reflective conductive film which is formed on the underlying film and which contains silver; and a metal oxide film which is deposited on the reflective conductive film and which is patterned so that the metal oxide film protruding from an edge of the reflective film comes into contact with the underlying film.

30. A liquid crystal device including a first substrate and a second substrate opposing each other and a liquid crystal enclosed in a gap between the first substrate and the second substrate, the liquid crystal device comprising:

a first lead provided on the first substrate;

a conductive film provided on the second substrate; and a conductive material connecting the first lead and the conductive film;

wherein the first lead comprises an underlying film, a metal film which is formed on the underlying film and which contains silver, and a metal oxide film which is deposited on the reflective conductive film and which is patterned so that the metal oxide film protruding from an edge of the reflective film comes into contact with the underlying film.

31. A liquid crystal device including a first substrate and a second substrate opposing each other and a liquid crystal enclosed in a gap between the first substrate and the second substrate, the liquid crystal device comprising:

an electrode provided on the first substrate for supplying a voltage to the liquid crystal;

a first lead connected to the electrode; and a driver IC chip connected to the first lead, wherein the first lead comprises an underlying film, a metal film which is formed on the underlying film and which contains silver, and a metal oxide film which is deposited on the reflective conductive film and which is patterned so that the metal oxide film protruding from an edge of the reflective film comes into contact with the underlying film.

32. A liquid crystal device including a first substrate and a second substrate opposing each other and a liquid crystal enclosed in a gap between the first substrate and the second substrate, the liquid crystal device comprising:

an underlying film provided on the first substrate;

a reflective conductive film which is formed on the underlying film and which contains silver;

a first transparent electrode deposited on the reflective conductive film and comprising a metal oxide film which is deposited on the reflective conductive film and which is patterned so that the metal oxide film protruding from an edge of the reflective film comes into contact with the underlying film;

a second transparent electrode provided on the second substrate; and a transflective portion provided corresponding to the crossing between the first transparent electrode and the second transparent electrode.

33. A liquid crystal device including a first substrate and a second substrate opposing each other and a liquid crystal enclosed in a gap between the first substrate and the second substrate, the liquid crystal device comprising:

an underlying film provided on the first substrate;

a reflective conductive film which is formed on the underlying film and which contains silver;

a first transparent electrode deposited on the reflective conductive film and comprising a metal oxide film which is deposited on the reflective conductive film and which is patterned so that the metal oxide film protruding from an edge of the reflective film comes into contact with the underlying film;

a second transparent electrode provided on the second substrate; and a color layer provided corresponding to a crossing between the first transparent electrode and the second transparent electrode.

34. A method for making a liquid crystal device including a first substrate and a second substrate opposing each other and a liquid crystal enclosed in a gap between the first substrate and the second substrate, the method comprising the steps of:

forming an underlying film on the first substrate;

forming a reflective conductive film containing silver on the underlying film; and forming a metal oxide film on the reflective conductive film so that the metal oxide film protruding from an edge of the reflective film comes into contact with the underlying film.

* * * * *